US008015256B2

(12) United States Patent
Pacheco

(10) Patent No.: US 8,015,256 B2
(45) Date of Patent: Sep. 6, 2011

(54) METHOD AND APPARATUS FOR PARALLEL SEQUENCING OF MESSAGES BETWEEN DISPARATE INFORMATION SYSTEMS

(75) Inventor: Gary Adam Pacheco, Waterloo (CA)

(73) Assignee: Medicalis Corp., Wilmington ( * ) Notice: Subject to any disclaimer, the term of this patent is extended or adjusted under 35 U.S.C. 154(b) by 1048 days.

(21) Appl. No.: 11/285,084

(22) Filed: Nov. 23, 2005

(65) Prior Publication Data
US 2007/0118601 A1    May 24, 2007

(51) Int. Cl.
G06F 15/16 (2006.01)
G06F 15/173 (2006.01)
(52) U.S. Cl. ........................ 709/207; 709/240
(58) Field of Classification Search .................. 709/204, 709/207, 240
See application file for complete search history.

(56) References Cited

U.S. PATENT DOCUMENTS

| | | | | |
|---|---|---|---|---|
| 6,459,698 | B1* | 10/2002 | Acharya | 370/392 |
| 6,748,498 | B2* | 6/2004 | Gharachorloo et al. | 711/141 |
| 6,816,889 | B1* | 11/2004 | Graham | 709/213 |
| 6,885,673 | B1* | 4/2005 | Tzeng et al. | 370/412 |
| 6,973,085 | B1* | 12/2005 | Acharya | 370/392 |
| 7,039,671 | B2* | 5/2006 | Cullen | 709/201 |
| 7,155,483 | B1* | 12/2006 | Friend et al. | 709/206 |
| 7,162,223 | B2* | 1/2007 | Kamat | 455/412.1 |
| 7,243,163 | B1* | 7/2007 | Friend et al. | 709/248 |
| 7,287,097 | B1* | 10/2007 | Friend et al. | 709/248 |
| 7,315,903 | B1* | 1/2008 | Bowden | 709/250 |
| 7,346,707 | B1* | 3/2008 | Erimli | 709/250 |
| 2002/0038228 | A1* | 3/2002 | Waldorf et al. | 705/7 |
| 2002/0198971 | A1* | 12/2002 | Resnick et al. | 709/221 |
| 2003/0009595 | A1* | 1/2003 | Collins | 709/247 |
| 2003/0105800 | A1* | 6/2003 | Cullen | 709/201 |
| 2003/0110230 | A1 | 6/2003 | Holdsworth et al. | |
| 2004/0230662 | A1 | 11/2004 | Estrada et al. | |
| 2005/0060408 | A1* | 3/2005 | McIntyre et al. | 709/225 |
| 2005/0198127 | A1* | 9/2005 | Helland et al. | 709/204 |

OTHER PUBLICATIONS

International Search Report, International Application No. PCT/CA2006/001929, International Filing Date Nov. 21, 2006.

* cited by examiner

*Primary Examiner* — Patrice Winder
*Assistant Examiner* — Ebrahim Golabbakhsh
(74) *Attorney, Agent, or Firm* — Grant Tisdall; Gowling Lafleur Henderson LLP

(57) ABSTRACT

A system and method are provided for coordinating concurrent processing of messages communicated over a network. The messages include a pair of related messages having a common first unique identifier and an unrelated message having a second unique identifier different from the first unique identifier. A sequencer module determines which of the plurality of messages are the pair of related messages and which of the plurality of messages are the unrelated message. The sequencer module identifies a sequence order for the pair of related messages by determining a first position in the sequence order for a first message of the pair of related messages and a second position in the sequence order for a second message of the pair of related messages. The sequencer module inhibits the progression of processing of the second message until the first message is no longer pending while facilitating concurrent processing of the unrelated message.

21 Claims, 14 Drawing Sheets

| Message | Stage | Lock |
|---|---|---|
| Bob[1] | Queue | - |
| Bob[2] | Queue | - |
| Pat | Queue | - |
| John | Queue | - |
| Bob[3] | Queue | - |
| Cat | Queue | - |
| Lisa[1] | Queue | - |
| Lisa[2] | Queue | - |

Figure 7a

| Message | Stage | Lock |
|---|---|---|
| Bob[1] | Pre Processing | - |
| Bob[2] | Queue | - |
| Pat | Queue | - |
| John | Queue | - |
| Bob[3] | Queue | - |
| Cat | Queue | - |
| Lisa[1] | Queue | - |
| Lisa[2] | Queue | - |

Figure 7b

METHOD AND APPARATUS FOR PARALLEL SEQUENCING OF MESSAGES BETWEEN DISPARATE INFORMATION SYSTEMS

FIELD OF THE INVENTION

This invention relates generally to the parallel processing of messages for integration engines.

BACKGROUND OF THE INVENTION

In an environment of disparate information systems having dissimilar communication and/or data storage formats, an interface engine is used to facilitate intercommunication between the disparate systems through appropriate network mapping and communication/data format transformations. Most interface engines today enforce safe sequential processing by filing one message at a time, even if none of the messages on the message queue are related (e.g. content in each of the related messages corresponds to a single entity). Sequential processing can help guarantee that the order of receipt of the related messages by a target system of the information systems is in the same as the order of message receipt by the interface engine, but sequential processing is also the slowest mechanism. Sequential processing also increases the risk of a single erroneous message blocking up the entire message queue creating undesirable down-time. To help get around this performance barrier, some interface engines opt to process messages in parallel. Parallel processing can dramatically increase the message throughput of the interface engine, however at the cost of potentially processing messages out of sequence. Accordingly, receipt of messages out of their original order in order critical environments, such as health care, can be an unsafe practice.

Therefore, maintaining the order of messages by the interface engine is important. For example, in the health care industry, messages processed out of order can lead to incomplete patient records, additional overhead for support staff, and in the worst case improper diagnosis or patient injury.

The systems and methods disclosed herein provide a system for providing parallel processing of messages by an integration engine to obviate or mitigate at least some of the above-presented disadvantages.

SUMMARY OF THE INVENTION

Most interface engines today enforce safe sequential processing by filing one message at a time, even if none of the messages on the message queue are related (e.g. content in each of the related messages corresponds to a single entity). Sequential processing can help guarantee that the order of receipt of the related messages by a target system of the information systems is in the same as the order of message receipt by the interface engine, but sequential processing is also the slowest mechanism. Sequential processing also increases the risk of a single erroneous message blocking up the entire message queue creating undesirable down-time. Contrary to current interface engines, a system and method are provided for coordinating concurrent processing of a plurality of messages communicated over a network between a source system and a target system. The plurality of messages are configured for including a pair of related messages having a common first unique message identifier and at least one unrelated message having a second unique message identifier different from the first unique identifier. The system and method comprise an input queue for storing the plurality of messages when received and an output message queue for storing the plurality of messages during message processing. The output message queue includes a plurality of execution streams for facilitating concurrent processing of the at least one unrelated message with at least one of the pair of related messages. The system and method also include a sequencer module coupled to the output message queue for determining using the first and second unique identifiers which of the plurality of messages are the pair of related messages and which of the plurality of messages are the at least one unrelated message. The sequencer module is further configured for identifying a sequence order for the pair of related messages according to a respective sequence indicator associated with each of the related messages, such that the sequence indicators are configured for use in assigning a first position in the sequence order for a first message of the pair of related messages and for use in assigning a second position in the sequence order for a second message of the pair of related messages. The system and method also have a registry coupled to the sequencer module and configured for storing a pending message status indicator for the first message in the output message queue, wherein the sequencer module inhibits the progression of processing through the output message queue for the second message until the pending message status for the first message is removed from the registry while facilitating concurrent processing of the at least one unrelated message though the output message queue.

One aspect provided is system for coordinating concurrent processing of a plurality of messages communicated over a network between a source system and a target system, the plurality of messages configured for including a pair of related messages having a common first unique message identifier and at least one unrelated message having a second unique message identifier different from the first unique identifier, the system comprising: an input queue for storing the plurality of messages when received; an output message queue for storing the plurality of messages during message processing, the output message queue including a plurality of execution streams for facilitating concurrent processing of the at least one unrelated message with at least one of the pair of related messages; a sequencer module coupled to the output message queue for determining using the first and second unique identifiers which of the plurality of messages are the pair of related messages and which of the plurality of messages are the at least one unrelated message, the sequencer module further configured for identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages; and a registry coupled to the sequencer module and configured for storing a pending message status indicator for the first message in the output message queue; wherein the sequencer module inhibits the progression of processing through the output message queue for the second message until the pending message status for the first message is removed from the registry while facilitating concurrent processing of the at least one unrelated message though the output message queue.

A second aspect provided is a method for coordinating concurrent processing of a plurality of messages communicated over a network between a source system and a target system, the plurality of messages configured for including a pair of related messages having a common first unique message identifier and at least one unrelated message having a second unique message identifier different from the first unique identifier, the method comprising the steps of: receiving the plurality of messages; identifying which of the plurality of messages are the pair of related messages and which of the plurality of messages are the at least one unrelated message using the first and second unique identifiers; identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages; monitoring the processing of the pair of related messages and the at least one unrelated message in an output message queue by inhibiting processing of the second message until a pending message status indicator for the first message is cleared while facilitating concurrent processing of the at least one unrelated message though the output message queue, the pending message status indicator for indicating that the first message is resident in the message output queue, the output message queue including a plurality of execution streams for facilitating concurrent processing of the at least one unrelated message with at least one of the pair of related messages when resident in the output message queue.

A third aspect provided is a computer program product for coordinating concurrent processing of a plurality of messages communicated over a network between a source system and a target system, the plurality of messages configured for including a pair of related messages having a common first unique message identifier and at least one unrelated message having a second unique message identifier different from the first unique identifier, the computer program product comprising: a computer readable medium; an input queue module stored on the computer readable medium for facilitating storage of the plurality of messages when received; an output message queue module coupled to the input queue module for facilitating storage of the plurality of messages during message processing, the output message queue module configured to include a plurality of execution streams for facilitating concurrent processing of the at least one unrelated message with at least one of the pair of related messages; a sequencer module coupled to the output message queue module for determining using the first and second unique identifiers which of the plurality of messages are the pair of related messages and which of the plurality of messages are the at least one unrelated message, the sequencer module further configured for identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages; and a registry module coupled to the sequencer module and configured for storing a pending message status indicator in a registry for the first message, when the first message is in an output message queue provided by the output message queue module; wherein the sequencer module inhibits the progression of processing through the output message queue for the second message until the pending message status for the first message is removed from the registry while facilitating concurrent processing of the at least one unrelated message though the output message queue.

BRIEF DESCRIPTION OF THE DRAWINGS

Exemplary embodiments of the invention will now be described in conjunction with the following drawings, by way of example only, in which:

FIGS. 7a through 7m provide a further example operation of the interface engine of FIG. 2.

DETAILED DESCRIPTION OF THE PREFERRED EMBODIMENTS

A method and system for sequencing of parallel message processing is described for use with disparate cooperating information systems via an interface engine, whose function includes message formatting, message ordering, and coordination of message receipt. The interface engine can be a software program designed to simplify the creation and management of interfaces between separate applications and information systems within an organization. Interface engines undertake messaging between systems, and normally manage any mapping, routing, translation, and data modification necessary to provide for the effective exchange of data around the organization.

Figure 1:
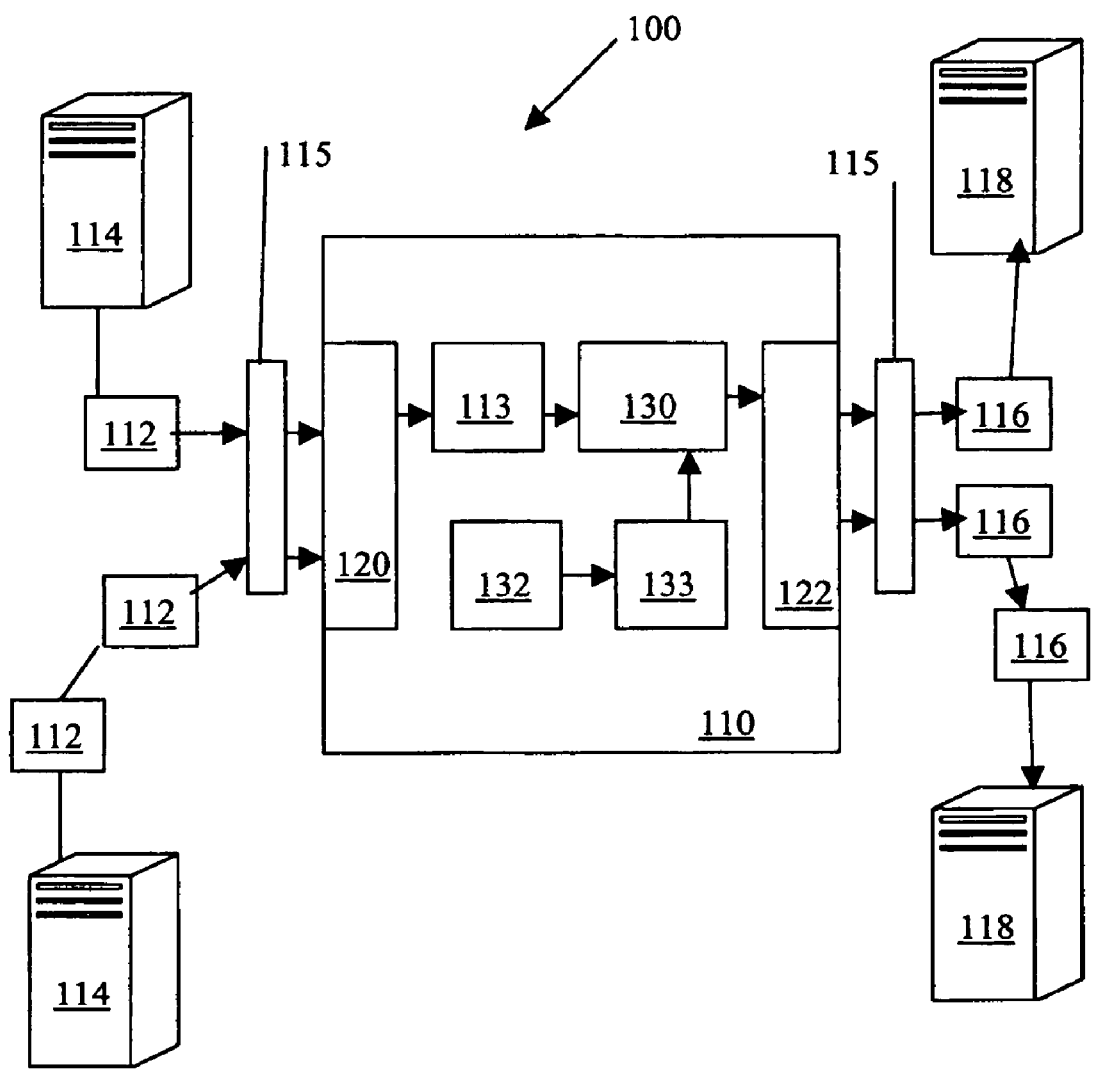
FIG. 1 is a block diagram of a interface system for sequencing network messages.

Referring to FIG. 1, an interface engine 110, for example embodied in software, hardware, or a combination thereof, is generally responsible for accepting streams of formatted input data messages 112 received from source systems 114 over a communications network 115, queuing the input messages 112 in an input message queue 113 (further described below), performing necessary transformations via a transformation module 117 (further described below) to produce formatted output data messages 116, queuing the output messages 116 in an output message queue 130 (further described below), and coordinating the routing (including arrival order) of the output messages 116 to targeted destination system(s) 118. It is recognized that the network 115 can be an intranet, an extranet (e.g. the Internet), or a combination thereof. The interface engine 110 also acts as a centralized, automated "hub" of the messaging network 115. Rather than connecting all systems 114, 118 to each other individually, the interface engine 110 acts as the intermediary for all, or otherwise selected, messaging 112, 116 between the systems 114, 118, as illustrated in FIG. 1 by way of example.

Further, the interface engine 110 uses parallel message processing by implementing multiple message execution streams 200, e.g. threads, (see FIG. 3) in one or more thread pools/stages 140 (see FIG. 6) in the output message queue 130, in order to help provide for ordered delivery of the messages 116 and message queue 130 management. It is recognized that the integration engine 110 can be applied to applications such as but not limited to business applications (e.g. e-business, financial transactions) as well as to healthcare installations for clinical data management. It is further recognized that the processing of the unrelated messages 112, 116 is done in parallel (as compared to typical prior art sequential processing of all related and non-related messages) by the interface engine 110 using the execution streams 200 running in parallel in the output message queue 130, wherein each of the stages 140 have one or more execution streams 200 available for use in message processing. Each execution stream 200 can be defined as such as but not limited to a thread (see FIG. 4). An example of a thread is such implemented by a JVM as native OS threads or alternatively as green threads (e.g. fibers), where multiple green threads are simulated threads using one native thread. Green threads can't take advantage of multiple CPUs, but they can have the advantage of lighter weight for context switching. An execution stream 200 (e.g. a thread being short for thread of execution) can be defined as one of a potentially large number of processes running in parallel within the output message queue 130 in general.

Figure 3:
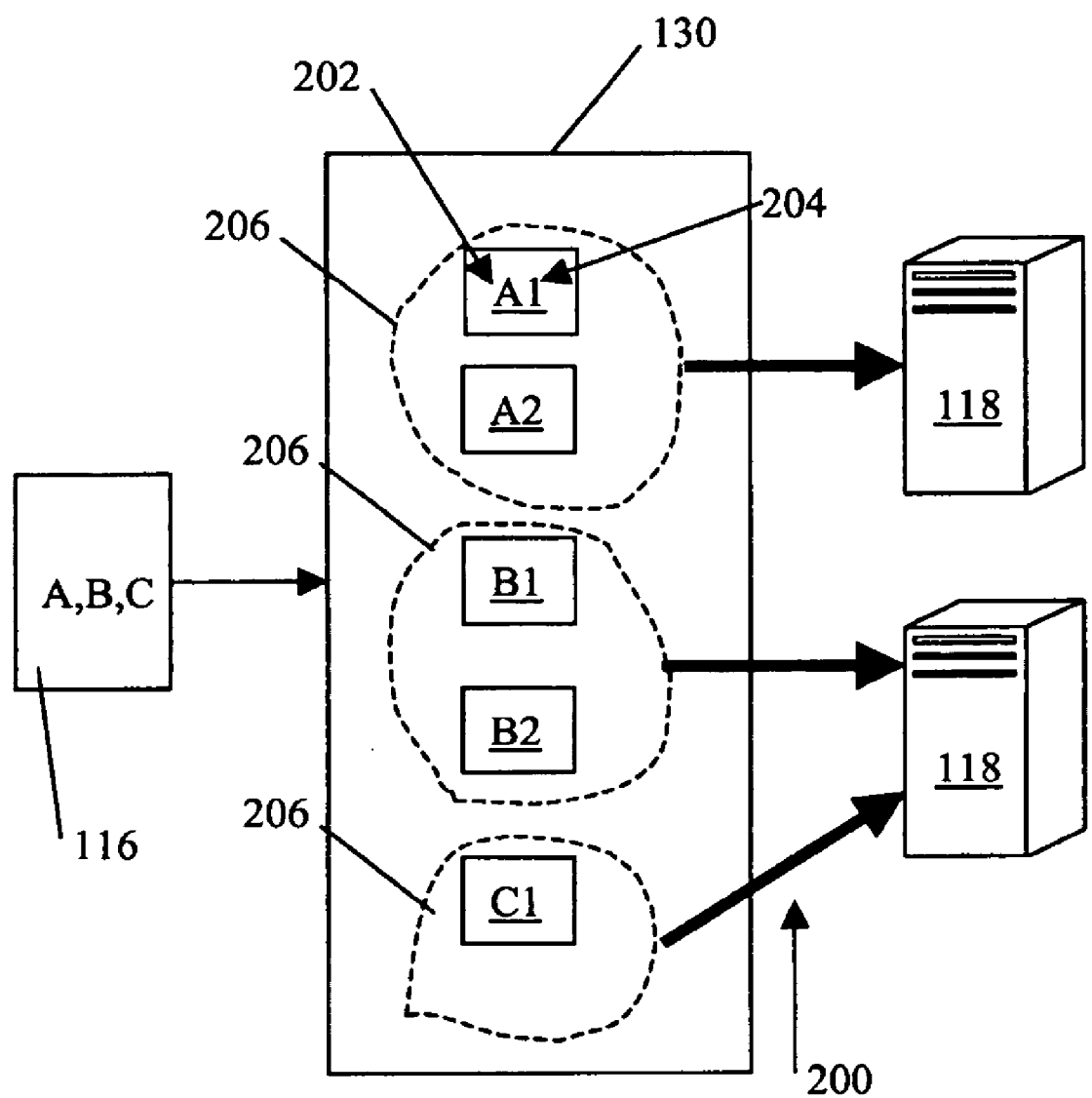
FIG. 3 is a block diagram of a parallel processing environment of the system of FIG. 1.
Figure 4:
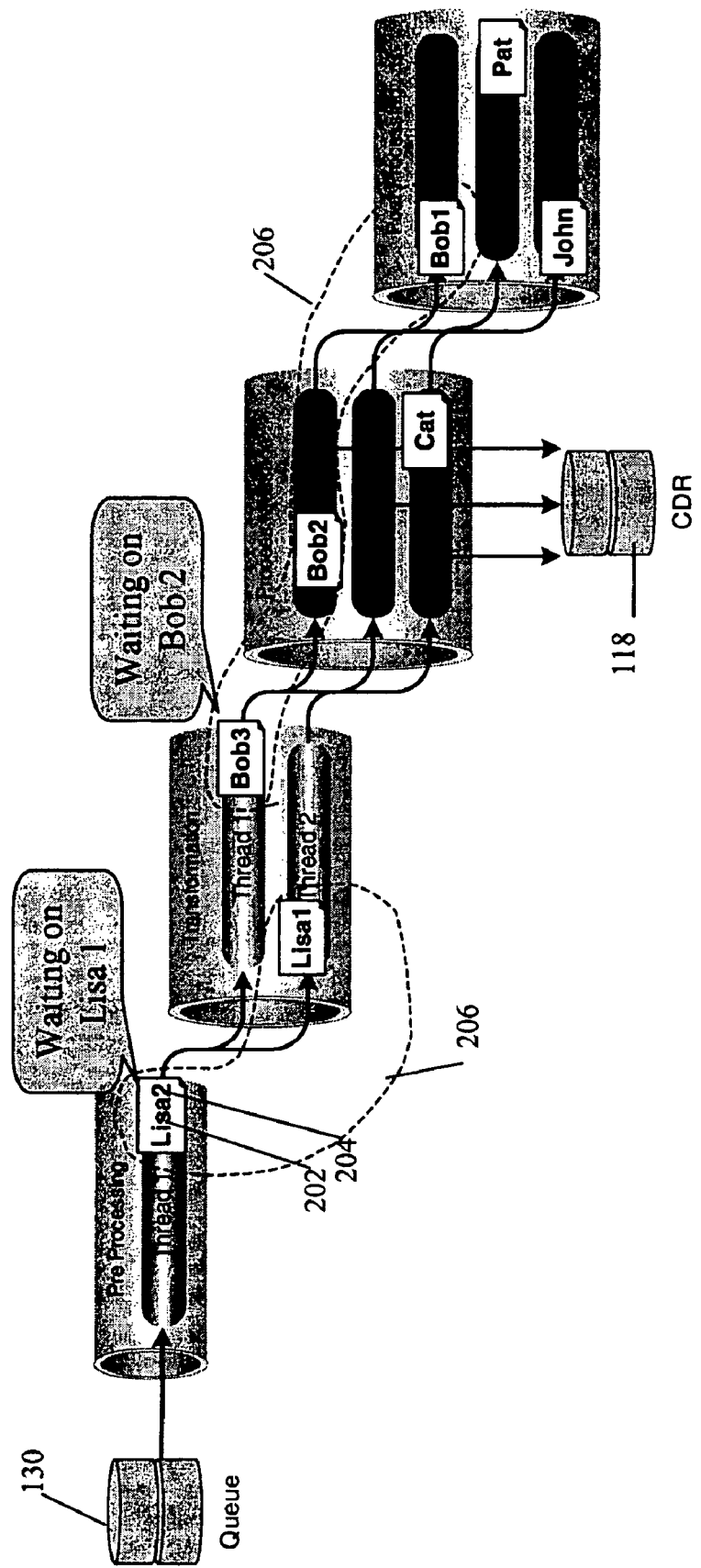
FIG. 4 is an example embodiment of the parallel processing environment of FIG. 3.

Further, referring to FIG. 3, the interface engine 110 uses unique identifier 202 (see FIG. 3) locking as a process of tracking the unique identifiers (ID) 202 in messages 112, 116 for the purpose of facilitating that output messages 116 for a given patient are filed in the expected sequence (e.g. indent order). This ID locking procedure provides for the Interface Engine 110 to take advantage of parallel message processing for input messages 112 having unrelated message data content (e.g. identified through dissimilar IDs 202), while providing for sequential ordering and receipt of those output messages 116 having related message data content (e.g. identified through similar IDs 202). By tracking the unique IDs 202 in each message 112, 116, as further described below, the interface engine 110 can facilitate output messages 116 for a given entity (e.g. patient, order, visit, etc. . . . ) being filed in the indented order, while allowing unrelated output messages 116 to be filed in parallel with the target system 118.

Referring again to FIG. 1, the systems 114, 118 can be considered as foreign systems 114, 118 representing independently designed/developed information systems. These foreign systems 114, 118 can have different owners and/or different data storage formats. It is recognized that communication of the messages 112, 116 between systems 114, 118 can be more direct if (1) the data sources for the foreign systems 114, 118 are common, or (2) the foreign system's 114, 118 data source(s) are accessible by drivers developed according to an Open Database Connectivity standard. The transformation module 117 of the interface engine 110 can be used to assist in data transformation in situations where the cases (1) and (2) do not apply.

The following description of the interface engine 110 content and operation is given using the HL7 standard applied to a health care environment 100, however it is recognized that other standards and environments can be used, if desired. One of the main integration tools in the health care environment 100 is the interface engine 110, which coordinates the transmission all of the data elements of messages 112, 116 to every system 114, 118 connected to the network 115. For example, admission, discharge, and transfer information messages 112 are interfaced from the source system 114 (e.g. registration system) to the target system(s) 118 such as but not limited to patient care information, clinical information systems, medical records systems, and a billing system. The interface engine 110 can also provide an interface for reporting from clinical information system results to the patient care information results.

The HL7 communication standard is used in the environment 100 to address the need for communication in healthcare between proprietary applications (of systems 114, 118) developed by different vendors. In particular, Health Level 7 (HL7) is the ANSI standard for information interchange between foreign systems 114, 118 in healthcare environments 100. However, it is recognized that the interface engine 110 can support messaging and protocol standards (e.g. message protocols, message mapping and message definitions) used in such as but not limited to HIPAA, HL7, XML, NCPDP, HCFA, ASTM, UB92 as well as support standard and customized input 112 and/or output 116 formats including ASC, X12N, Name Value Pair, Text Report, Fixed Length, User-Delimited, SQL Statements, CATHCOR, DICOM, and other formats that have a reasonably ascertainable and defined data structure (e.g. structured definition language).

Interface Engine 110

Figure 2:
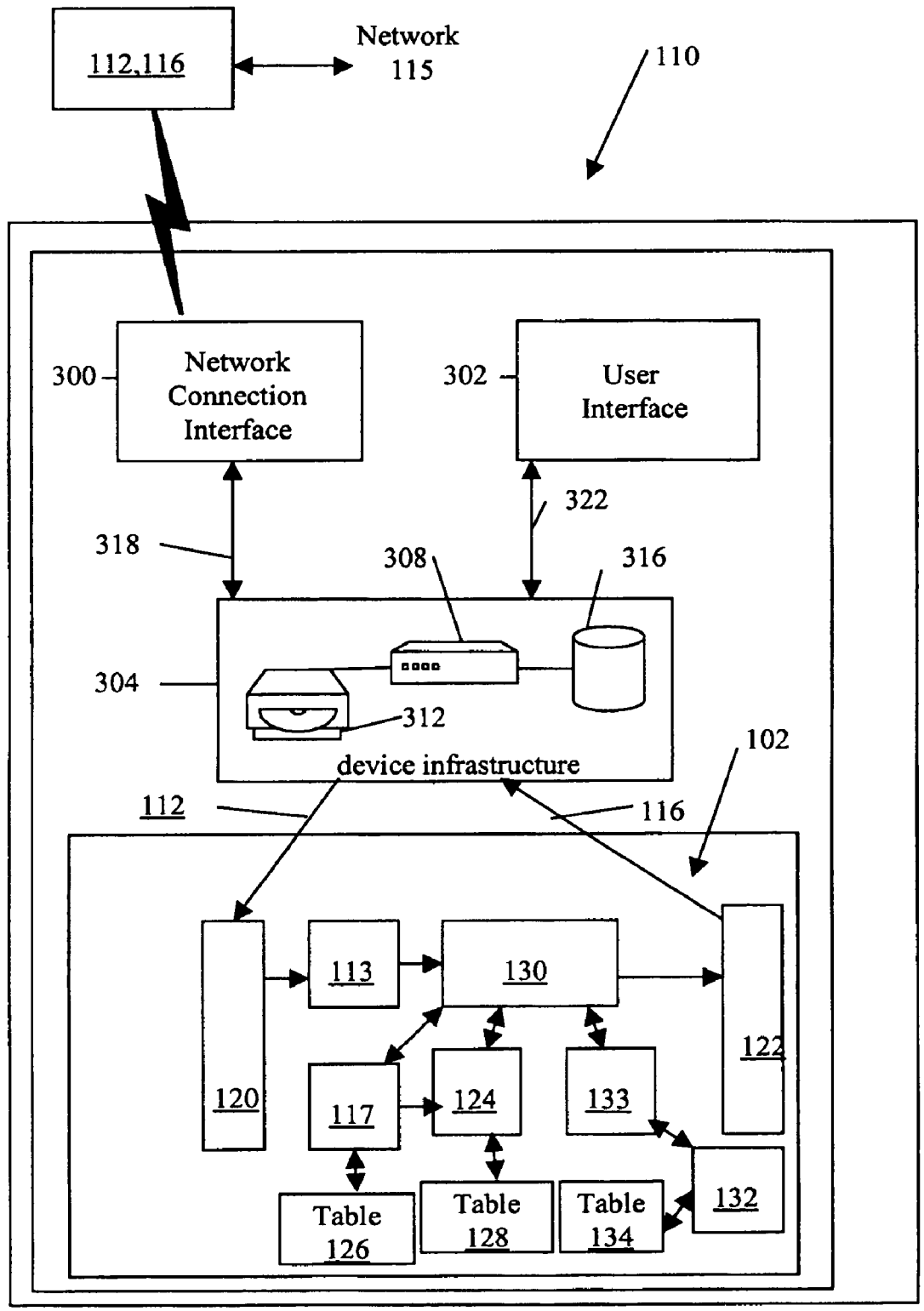
FIG. 2 is a block diagram of an interface engine of the system of FIG. 1.

Referring to FIG. 2, the interface engine 110 includes a router/network routing module 124 (e.g. device hardware and/or software) that determines the next network 115 point/address to which the output message 116 should be forwarded toward its targeted system 118 on the network 115. The interface engine 110 includes a network connection interface 300, such as a wireless transceiver or a wired network interface card or a modem, coupled via connection 318 to a device infrastructure 304, for transmitting and receiving the messages 112, 116. The interface engine 110 can also have a user interface 302 coupled to the device infrastructure 304 by connection 322 for facilitating in-person diagnostics by a technician, as well as configuration of the interface engine 110 by a network administrator. The user interface 302 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 304. The device infrastructure 304 includes a computer processor 308 and the associated memory module 316.

The processor 308 manipulates the operation of the network interface 300, and if present the user interface 302, by executing related instructions provided by an operating system and engine components 102 (e.g. located in the memory module 316), further described below. Further, it is recognized that the device infrastructure 304 can include a computer readable storage medium 312 coupled to the processor 308 for providing instructions to the processor and/or to load/update the components 102 in the memory module 316. The computer readable medium 312 can include hardware and/or software such as, by way of example only, magnetic disks, magnetic tape, optically readable medium such as CD/DVD ROMS, and memory cards. In each case, the computer readable medium 312 may take the form of a small disk, floppy diskette, cassette, hard disk drive, solid-state memory card, or RAM provided in the memory module 316. It should be noted that the above listed example computer readable mediums 312 can be used either alone or in combination.

Engine Components 102

The interface engine 110 includes a number of cooperating components 102 to provide for the transformation (where required) and coordination of receipt and subsequent transmission of the input 112 and output 116 messages respectively, in a parallel message processing environment. In particular, the interface engine 110 has: a receiver 120 for receiving the input messages 112, the input queue 113 for holding the input messages 112 in temporary storage pending transformation/routing of the input messages 112 to produce the output messages 116; the transformation module 117 for transforming the communication and/or data format of the input messages 112 to the specified network 115 communication and/or data format (of the target system 118) of the associated output messages 116; the routing module 124 for determining the network 115 routing for the output messages 116 to reach the intended target system 118; a queue manager 133 for managing the progression of the parallel processed input messages 112 though various stages 140 (see FIG. 6) of the output message queue 130, the output message queue 130 for holding the output messages 116 in temporary storage of the various stages 140 pending filing of processed output messages 116 in the respective target systems 118 in a predetermined indented order (e.g. BOB1 is processed and filed prior to BOB2—see FIG. 4); and a sequencer module 132 for tracking unique identifiers 202 (see FIG. 3) in the output messages 116 for the purpose of coordinating that the output messages 116 related to a given patient (e.g. entity) are received by the targeted system 118 in the expected message sequence, as exemplified by organized output message 116 processing in the various stages 140 of the output message queue 130. The sequencer module 132 can be responsible for monitoring the locking of respective output messages 116 in the output queue 130 (and the progress from stage 140 to stage 140) based on the unique identifier 202 of the output message(s) 116. Further, it is recognized that the sequencer module 132 can know how many stages 140 there are in the output message queue 130 and in what order to move the output messages 116 through the stage(s) 140 of the output message queue 130. It is recognized that the capabilities and functioning of the sequencer module 132 and the queue manager 133 can be configured as described above, or alternatively by example can be combined to be one module (not shown) performing all relevant functions of both the sequencer module 132 and the queue manager 133, if desired.

It is noted that related input messages 112 are recognized as such by the sequencer module 132 due to the unique identifier 202 (e.g. denoting a common patient) included with the related input messages 112, as further described below. The sequencer module 132 can be responsible for the monitoring of separate threads 200 in the event that processing of an earlier but unrelated input message 112 is blocking the processing and receipt of a related input message 112, as further described below, where the queue manager 133 is responsible for creation and management of the respective threads 200 of the various stages 140 (e.g. thread pools). For example, referring to FIG. 4, processing of an input message 112 for one patient (e.g. BOB#3) is holding up the processing of a first input message 112 for a different patient (e.g. LISA#1) that was received by the receiver 120 after a second input message 112 for the same patient (e.g. LISA#2). The sequencer module 132 in this case would coordinate the holding up of delivery (i.e. facilitate the respective ID lock) of the earlier received input message LISA#2 until receiving the acknowledged filing of the later received and related input message LISA#1 by the targeted system 118. It is recognized that the sequencer module 132 can also use the ID locking procedure to monitor the passing of the output message(s) 116 from one stage 140 to the next in the output message queue 130. The interface engine 110 also has a transceiver 122 for transmitting the output messages 116 from the last stage 140 of the output message queue 130 to the intended target system(s) 118 over the network 115.

It is also recognized that the ID locking monitored by the sequencer module 132 is configurable. For example, by default the sequencer module 132 can identify the input messages 112 by unique identifiers 202 such as but not limited to: Patient ID; Placer Order ID; and Filler Order ID. Further, the user of the interface engine 110 can add or remove more unique identifiers 202 types used by the sequencer module 132, as desired. For example, the user can add patient gender as an unique identifier 202 to locking rules used by the sequencer module 132. This means for example that corresponding output messages 116 would be kept in sequence by patient ID, etc., plus only 1 male and 1 female patient output message 116 would be filed in the target system 118 at the same time. For example, the locking rules would look like: PID.2; PID.3; ORC.2; and ORC.3.

It is recognized that functionality of the components 102 can be provided by hardware, software, or a combination thereof. Further, it is recognized that the individual functionality of the components 102 can be as shown, can be combined (not shown), or can be further subdivided into additional components 102 (not shown). For example, the transformation provided by the transformation module 117 can be combined with the determination of related input messages 112 through the IDs 202 by the sequencer module 132. An example of this functionality combination is when a selected input message 112 is only transformed (message protocol and/or data content) once the input message 112 is determined to be unrelated and therefore transformed and parallel processed—or for related input messages 112 in which the first input message 112 of the indented order is transformed and parallel processed before the second input message 112 of the indented order. A further example of this functionality combination is where the sequencer module 132 determines the network 115 routing once the output message 116 has been put in its indented order via the multiple-thread 200 arrangement. Further, it is recognized that the input 113 and output 130 message queues can be combined as a single engine storage (not shown), as desired. A more detailed functional description of the components 102 of the interface engine 110 is given below.

Receiver 120

The receiver 120 is a fully configurable TCP/IP, or other network based communication protocol, receiver for receiving the input messages 112 from the source systems 114 or other interface engines (e.g. a distributed network of interface engines—not shown) and storing the received input messages 112 in the input message queue 113. The receiver 120 can employ data decryption for secured transport through the network 115. Accordingly, the receiver 120 of the interface engine 110 receives patient and clinical information messages 112 (for example) based on various electronic data interchange (EDI) messaging standards/or other messaging standards, (e.g. such as HL7) containing, for example demographic, scheduling and clinical list information, and X12 for billing data. The receiver 120 operates as a TCP/IP listener which is listening on an input port number. The application/system 114 sending the input messages 112 is configured to connect via TCP/IP as a client to this input port on interface engine 110 that the listener is running on. It is recognized that other network 115 communication protocols, such as but not limited to LLP and VPN can be used, if desired. The receiver 120 could be responsible for assigning a sequence indicator 204 (see FIG. 3) to each of the input messages 112 received by the interface engine 110, for example by time stamping, and/or predefined priority based on at least one of the message type or content type and importance/priority of the source/target systems, to reflect a desired indent order for input messages 112 related through a common unique identifier 202. It is also recognized that the sequence indicator 204 can be assigned by the interface engine 110, the source system(s) 114, or a system 100 administrator (not shown), or a combination thereof.

Input Message Queue 113

The input message queue 113 is used by the interface engine 110 to store the received input messages 112 pending required processing such as but not limited to network communication formatting, data formatting. For example, the transformation module 117, the queue manager 133, and/or the sequencer module 132 can coordinate the retrieval of the queued input messages 112 from the input queue 113 for processing into the corresponding output messages 116 through the output message queue 130. It is recognized that the input queue 113 can be an indexed, randomly searchable storage device such as a First-In-Any-Out (FIAO) device as is known in the art, in order to facilitate selection of the queued input messages 112 in the order required to help satisfy the rule that related input messages 112 (e.g. for a given patient, order, visit, etc. . . . ) are filed with the associated target system 118 in the indented order. This is accomplished by the interface engine 110, while allowing unrelated output messages 116 to the filed (with their respective target system 118) in a parallel processing manner. It is recognized that the sequence indicators 204 could be implicitly associated with the received input messages 112 via their order in the input queue 113. The interface engine 110 can be aware of all messages 112, 116 for pre- and/or post-processing, in error queues within the engine 110 domain. The engine 110 may no longer be aware of the output messages 116 that have left the engine 110 domain (e.g. sent over the network 115 to the target system 118).

The time stamps (or other sequence indicators 204 such as but not limited to priority values—high/medium/low) are associated with the messages A1, A2, B1, B2, C1 by the source systems 114, for example, as the messages A1, A2, B1, B2, C1 (and associated data content) are generated and subsequently submitted to the interface engine 110 over the network 115. Alternatively, the sequence indicators 204 can be assigned to the input messages 112 in the message order as received by the interface engine 110. It is also recognized that the sequence indicators 204 can be assigned to the input messages 112 both by the source systems 114 and the interface engine 110, as desired, with additional conflict resolution business logic for determining which sequence indicators 204 takes precedence in the event of conflict between the sequence indicator 204 assigned by the source system 114 and the sequence indicator 204 assigned by the interface engine 110. Further, it is recognised that the interface engine 110 can hold up the processing of messages in the output queue 130 (i.e. delaying the passing of the message 116 currently being processed from one stage 140 to the next stage 140) in the event that one of the newly received input messages 112 is determined to have an earlier (or higher priority) sequence indicator 204 than the related message 116 already resident in the output queue 130.

Transformation Module 117

The transformation module 117 can be software/hardware that is specially designed to translate information in one system's data sources 114 into a format that another system 118 can interpret. For example, the module 117 provides for an event that occurs in the source application system 114 be replicated and transmitted to any target system(s) 118 requiring knowledge of that event/data. The module 117 reads in the appropriate HL7 input messages 112 from the input queue 113, performs whatever HL7 message transformation is required based on knowledge of the source system 114 format and the target system 118 expected format, thereby putting the data of the message 118 out in the format that the target system 118 can understand and consume. It is recognised that the module 117 can have access to a transformation table 126 providing each combination of source 114 and target 118 system formats. Examples of message and data content formats are such as but not limited to HIPAA, HL7, XML, NCPDP, HCFA, ASTM, UB92 as well as ASC, X12N, Name Value Pair, Text Report, Fixed Length, User-Delimited, SQL Statements, CATHCOR, DICOM, and other formats that have a reasonably ascertainable and defined data structure (e.g. structured definition language).

It is recognized that comprehensive and flexible data manipulation functions of the transformation module 117 can be done on a field-by-field basis of the data content of the input messages 112, providing data transformation from any messaging format to virtually any other format included in the transformation table 126.

This transformation table 126 can include such transformation information as: input information including the input message 112 location and format to be processed by the transformation module 117; output information including the output message 116 location and the format to be processed by the transformation module 117; and the location of the input 113 and output 130 message queues. It is recognized that the message queues 113, 130 can be useful for bi-directional interface engine 110 operation, for example in Order/result and billing functions.

Routing Module 124

Referring again to FIG. 2, the routing module 124 can have access to network configuration information in a routing table 128 (e.g. number of, address, communication format for each system 114,118 linked to the interface engine 110, and other routing information). In general terms, the interface engine 110 is connected to at least two systems 114, 118 and decides which way to send each received message 112 based on its current understanding of the state of the systems 114, 118 the interface engine 110 is connected to over the network 115. The interface engine 110 is located logically between source systems 114 and target systems 118, and can be for example a point-of-presence on the Internet. It is recognised that the interface engine 110 can included as part of a network switch (not shown). Further, it is recognised that the interface engine 110 may create or maintain the tables 126, 128 of the available system 114, 118 network 115 addresses and formats communicating a given message 112, 116. The content of the message 112 is converted by the module 124 into the output message 116 content suitable for delivery and consumption by target systems 118 of the network 115. The tables 126, 128 can be updated based on user-defined intervals by the network administrator.

For example, it is recognized that the routing module 124 can function as a device such as but not limited to a router, an edge router that interfaces with an asynchronous transfer mode (ATM) network, a brouter that is a network bridge combined with a router, and a server that provides services to other computer programs (and their users) such as in a client/server programming model where the server is a program/hardware that awaits and fulfills requests from client programs/hardware. Further, it is recognized that the interface engine 110 can function as a Web server that serves requested HTML/XML pages or files as messages 116. The network 115 would be the Internet or other wide/local area network using IP addressing between the systems 114, 118. For example, the target system 118 could be a Web client (e.g. the requesting program including a web browser) of one of the source systems 114. It is recognized that the message 116 routing performed by the routing module 124 can be based on user-defined rules and conditions contained in the routing table 128.

It is recognized that the message 112, 116 activity and processing can be monitored by the sequencer module 132, based on user-defined rules or conditions stored in a sequencer table 134.

Output Message Queue 130

The output message queue 130 is used by the interface engine 110 to store the generated output messages 116 pending filing of related output messages 116 in the respective target systems 118 in a predetermined indented order. For example, the sequencer module 132 can coordinate the retrieval of the queued output messages 116 from the output queue 130 for sending to the target system 118, via the transmitter 122, in order to help ensure correct transmission order of the related output messages 116 as identified by the unique IDs 202 while allowing for parallel processing and delivery of unrelated output messages 116 (i.e. output messages 116 having dissimilar unique IDs 200). It is recognized that the output queue 130 can include at least one indexed, randomly searchable storage device such as a First-In-Any-Out (FIAO) device as is known in the art, in order to facilitate selection of the queued output messages 116 in the order required to help satisfy the rule that related output messages 116 (e.g. for a given patient, order, visit, etc. . . . ) are filed with the associated target system 118 in the indented order. This selection of the output messages 116 in the output queue 130 (i.e. coordinating or otherwise affecting their resident time at each stage 140 where needed) is accomplished by the interface engine 110, which allows unrelated output messages 116 to the filed (with their respective target system 118) in a parallel processing manner. It is recognized that the output queue 130 could embody multiple threads 200 (see FIG. 2), each of the threads having a separate portion of the output queue 130 as desired.

Referring to FIGS. 7a through 7m, output messages 116 are listed in the expected filing sequence within each stage 140 of the output message queue 130. For example, the top of the lists is the first output message 116 expected to exit the output message queue 130, and the bottom of the lists is the last output message 116 expected to exit the output message queue 130. The stages 140 can include stages such as but not limited to:

- a queue stage, represented for example by the input message queue 113, in which the interface engine 110 stores the input messages 112 in the queue 113 in the order they were received. The queue 113 also contains the IDs 202 that were identified from the input messages 112;
- a Pre Processing stage 144 where the output messages 116 are parsed into a basic XML structure and qualified;
- a Transformation stage 146 where output messages 116 are transformed according to user defined mappings and internal transformations via the transformation module 117. It is recognized that the output message 116 may be mapped numerous times, split and marked for delivery to numerous target systems 118;
- a Process Message stage 148 where output messages 116 are routed and transmitted to their final destination via the transmitter 122; and
- a Post Processing stage 150 where the output messages 116 are transferred from a received status to an error or processed status.

It is recognized that all stages 140, except for the Queue stage, can have a user configurable number of threads 200 available for parallel execution. This number can be static or dynamically assignable, as desired. For example, in FIG. 4 the user has configured the output message queue 130 with the following thread pools: Pre Processing=1 thread 200, Transformation=2 threads 200, Process Message=3 threads 200, and Post Processing=3 threads 200. As the output messages 116 pass through the output message queue 130 and are organized by the sequencer module 132, the list of output messages 116 will change, as reflected in FIGS. 7a through 7m by example only, further described below. It is assumed that each stage 140 of the output message queue 130 requires more resources then the previous, therefore output messages 116 may take longer to pass through each stage 140 as they progress through the output message queue 130. For example, the Process Mapping stage 148 is where the output messages 116 are transmitted to the target system 118. If the target system 118 is slow and/or the network 115 is slow, this stage 148 may take 2 seconds per message, for example, where the Pre Processing stage 144 may only take 0.05 seconds, for example.

Queue Manger 133

Figure 6:
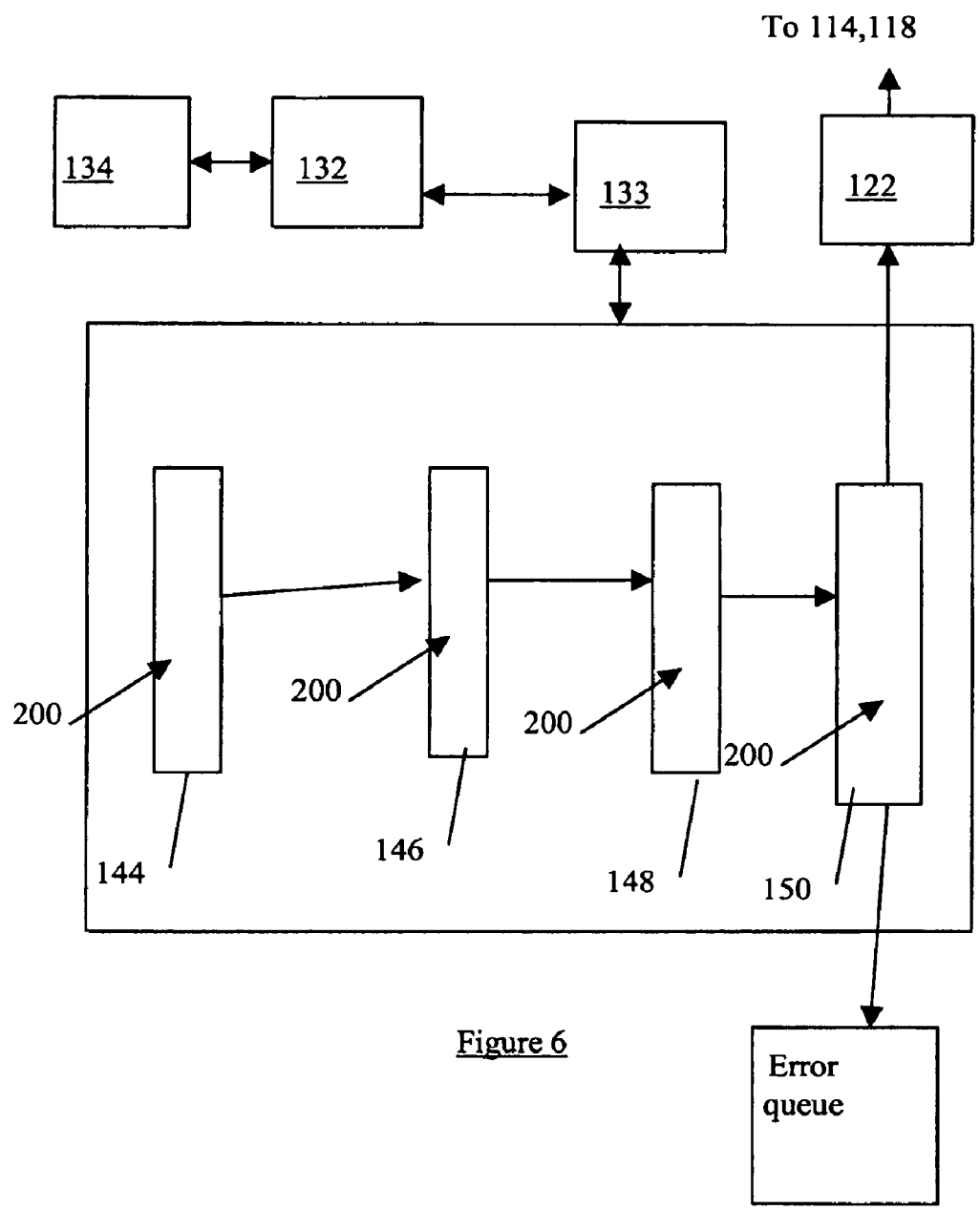
FIG. 6 is a further embodiment of the output message queue of FIG. 2.

Referring to FIGS. 2 and 6, the queue manager 133 manages the processing of output messages 116 in the output message queue 130 via, for example, the four stages 140 and the input message queue 113. Each stage 140 can have a user configurable number of threads 200 available for parallel processing of the output messages 116 within that stage 140. When the output queue 130 receives the data of the input messages 112 from the queue 113 in the order they were received, the queue manager 133 asks the sequencer module 132 for access to the first stage 144, passing the sequencer module 132 the set of IDs 202 corresponding to that data of the input message 112. The sequencer module 132 1) checks if there is an available thread 200, 2) checks if there are any active threads 200 in that stage 144 with a matching ID 202 of the input message 112 data. If there are no threads 200 available in the first stage 144, the sequencer module 132 will wait until one of the occupied threads 200 finishes, then gives that stage thread 200 to the queue manager 133. If the stage 144 already has an active thread for the ID 202, the sequencer module 132 will wait for that specific thread 200 to finish, then give the thread 200 to the queue manager 133. When the sequencer module 132 hands over the thread 200, the sequencer module 132 adds the IDs 202 for that output message 116 to the locked ID pool represented in the registry of the sequencer table 134 for the stage 144 in question. This process continues and the queue manager 133 feeds the data of the input messages 112 into the first stage 144 from one input message 112 at a time. For example, if the first stage 144 has three threads 200 available, then data from up to three input messages 112 will be fed into that stage 144 at any one time.

The same process as described above is followed in each subsequent stage 146, 148, 150. Once the thread 200 in the first stage 144 has completed its work on the data of the respective input message 112, the queue manager 133 asks the sequencer module 132 for access to the next stage 146 for the corresponding output message 116. The sequencer module 132 knows that from stage 144 we must go to stage 146 (or from stage 146 we go to stage 148, etc. . . . ). As noted above, the sequencer module 132 checks the ID 202 locks in the registry of the sequencer table 134 specified for the stage 146, and checks for an available thread 200 in that stage 146. When the sequencer module 132 finds an available thread 200, the sequencer module 132 1) Locks the IDs 202 for the output message 116 in the stage 146 represented in the locked ID registry of the table 134, and 2) removes the locks for the output message 116 from the stage 144 represented in the locked ID registry of the table 134. The queue manager 133 is then informed by the sequencer module 132 (or otherwise queries the sequencer table 134) that the locks have been updated in the sequencer table 134 and then the queue manager 133 hands the stage 146 thread 200 over to the corresponding stage 144 thread 200 for the output message 116 being processed, thus facilitating the progression of the output message 116 processing from one stage 140 (e.g. thread pool) to the next stage 140 until ultimately the output message 116 is ready for transmission by the transmitter 122. The stage 144 thread 200 then passes via the queue manager 133 the contained output message 116 and any additional data on to the stage 146 thread 200. It is noted that stage 144 can have no idea what stage 146 is or what stage 146 is going to do with the passed output message 116, as potentially for all stages 140 with respect to one another.

The same process as described above then guides the output message 116 through stages 148 and 150. It is recognised that there is no need to know when the output message 116 is complete (i.e. finished with the final stage, in this case stage 150) since the ID locking can be managed per stage 140. The sequencer module 132 simply monitors thread 200 traffic, and pauses processing for message threads 200 that are linked by their common ID 202. The output message 116 processing monitored by the sequencer module 132 is akin to the concept of a rail yard, where there are numerous rails and switches that can move trains from rail to rail. The switch operator can manage traffic by putting trains that are related on the same track, forcing them to move in sequence, while freeing up the rest of the rails for unrelated traffic.

Accordingly, it is recognized that the execution streams 200 at each stage 140, when available, can be used for processing of any respective message 116 slated for that stage 140. For example, the first execution stream 200 at the second stage 146 can be used for message A1 (see FIG. 3) and the second execution stream 200 at the second stage 146 can be used for message B1, and then once the ID 202 locks for the first and second streams 200 are removed for the second stage 140, the sequencer module 132 and/or the queue manager 133 can assign the first execution stream 200 at the second stage 146 for processing message B2 and the second execution stream 200 can be used at the second stage 146 for facilitating the processing of the message A1. In effect, this switching of streams 200 between the stages 140 can be done, once assigned to a family of related messages 116 a particular stream 200 in a respective stage 140 can remain available for the next message 116 of the message family (e.g. each of the related messages 116 having a common unique ID 202), or a combination thereof.

Sequencer Module 132

In one example embodiment, the sequencer module 132 does not actually move data from stage 140 to stage 140, nor does the sequencer module 132 directly receive or send messages 112, 116. As described above, the movement of the output message 116 processing from stage 140 to stage 140 of the output message queue 130 can be manipulated by the queue manager 133, while the receipt and sending of messages 112 and 116 is experienced by the input message queue 113, the output message queue 130, and the transmitter 122. The sequencer module 132 knows how many stages 140 there are and in what order to move the output messages 116 through the message pipeline (e.g. also referred to as the output message queue 130). It is recognized that the message pipeline can be defined to include both the input message queue 113 and the output message queue 130, as desired.

As described above, the input messages 112 received by the interface engine 110 comprise both related and unrelated message content. The related input messages 112 are identified by the sequencer module 132 through the unique message ID 202 included in the input messages 112, the unique message ID 202 such as but not limited to a patient medical record number, an account number, or a customer number, or a combination thereof. Accordingly, referring to FIG. 3, the unique message ID 202 is parsed from the input message 112 and used to assign the input messages 112 into a plurality of message groups 206, each of the message groups 206 being associated with one of the unique message IDs 202. It is recognized that the input messages 112 received by the interface engine 110 are for multiple non-related entities (e.g. patients), with a group 206 of the input messages 112 associated with the same unique message ID 202. For example, referring to FIGS. 2 and 3, the interface engine 110 receives a plurality of messages for 3 patients A, B, C in a given time interval, such that two input messages 112 are for patient A (i.e. messages A1 and A2), two of the input messages 112 are for patient B (i.e. messages B1 and B2), and one of the input messages 112 is for patient C (i.e. message C1). It is recognized that messages A1 and A2 have the same unique ID "A" with message A1 having an earlier sequence indicator 204 (e.g. time stamp) than message A2, messages B1 and B2 have the same unique ID "B" with message B1 having an earlier time stamp 204 than message B2, and message C1 has the unique ID "C". Therefore, the target systems 118 expect the related output messages 116 (e.g. having the same unique message ID 202) in the indented order, as exemplified by the sequence indicators 204.

The status of transmission of the output messages 116 can be stored in the ID lock registry represented in the sequencer table 134 (or other storage structure as desired), which can contain information on which messages 116 belong to which message groups 206, as well as (or) which message 116 in the indent order (signified by the sequence indicators 204) is currently being processed. For example, the sequencer module 132 can record in the registry represented in the sequencer table 134 that all output messages 116 with a specified ID 202 are prohibited from transmission through the transmitter 122 until the pending transmitted output message 116 is cleared (i.e. the ID 202 lock is released). One example operation of this locking process is where the sequencer module 132 first checks with the registry represented in the sequencer table 134 each time a selected one of the output messages 116 is to be sent, such that if the corresponding ID 202 of the selected output message 116 is in the registry represented in the sequencer table 134 then the selected output message 116 is further held in the output queue 130 until the corresponding ID 202 has been cleared from the registry represented in the sequencer table 134. The sequencer module 132 can be responsible for clearing the IDs 202 in the registry represented in the sequencer table 134 once the sequencer module 132 has determined or is otherwise notified that the corresponding pending output message 116 has been successfully processed by the target system 118. For blocked/locked output messages 116, the sequencer module 132 can periodically check (or be informed by) the registry represented in the sequencer table 134 to see if the lock status has been changed to unlocked, thereby allowing the selected output message 116 to be sent to the transmitter 122 and the corresponding ID 202 once again placed in the registry represented in the sequencer table 134 to inhibit further transmission of related output messages 116 from the message group 206. Further clearance of the registry represented in the sequencer table 134 of the associated message ID 202 can be done as described above. It is recognised that the registry represented in the sequencer table 134 can be checked by the sequencer module 132 each and every time a selected output message 116 is to be sent, in order to determine if a matching ID 202 is present (indicating that the selected output message 116 should remain in the output queue 130 until further notice).

The unique IDs 202 are used by the sequencer module 132 to associate related input messages 112 with one another into the patient (for example) message groups 206 with ordering within the groups 206 assigned based on the sequence indicator 204. The sequence module 132 parses the sequence indicator 204 for each input message 112 of a selected group 206 and then compares the sequence indicators 204 to determine the indented order of the input messages 112 within each patient message group 206. It is noted that the coordinated transmission of the corresponding output messages 116 of each patient message group 206 is managed by the sequencer module 132 based on the input message 112 order defined by the comparable sequence indicators 204 (e.g. output message A1 should be delivered before output message A2 based on an earlier time stamp—see FIG. 3). For example, once the sequencer module 132 receives an acknowledgement that the current output message 116 has been received and successfully processed by the target system 118, the sequencer module facilitates retrieval of the next related output message 116 slated for transmission from the output message queue 130, based on indent order, and then facilitates the forwarding of the next related output message 116 to the transmitter 122 for sending to the target system 118. It is recognized that unrelated output messages 116 are allowed by the sequencer module 132 to be filed in their target systems 118 in parallel, i.e. messages 116 from groups 206 (e.g. "A", "B", and "C"—see FIG. 3) are filed in parallel while multiple messages 116 within the groups 206 (e.g. A1/A2, B1/B2) are coordinated for filing in their indented order based on the compared sequence indicators 204. For example, the sequencer module 132 can facilitate placement of the related output messages 116 of a group 206 in their indent order, thus facilitating the coordination of output message 116 transmission.

Transmitter 122

A transmitter 122 is a fully configurable TCP/IP, or other network based communication protocol, transmitter for transmitting the output messages 116 to the target systems 118 or other interface engines (not shown) once obtained from the output message queue 130. The transmitter 122 can employ data encryption for secured transport through the network 115. Accordingly, the transmitter 122 of the interface engine 110 transmits patient and clinical information output messages 116 based on various electronic data interchange (EDI) messaging standards, (e.g. such as HL7) containing, for example demographic, scheduling and clinical list information, and X12 for billing data. The transmitter 122 operates as a TCP/IP sender which is sending on an output port number. The application or target system 118 receiving the output messages 116 is configured to connect via TCP/IP as a client to this output port on interface engine 110 that the sender is running on. It is recognized that other network 115 communication protocols, such as but not limited to LLP and VPN can be used, if desired. The transmitter 122 can receive or otherwise obtain the output messages 116 from the output queue 130, as coordinated by the sequencer module 132 and the queue manager 133.

Example Message 112, 116 Types

The input messages 112 received by the interface engine 110 comprise both related and unrelated message content. It is recognized that the input messages 112 received by the interface engine 110 are for multiple non-related entities (e.g. patients), with groups of the input messages 112 associated with the same unique message ID 202. It is noted that the coordinated transmission of the corresponding output messages 116 of each patient message group is managed by the sequencer module 132 based on the input message 112 order defined by the comparable sequence indicators 204. The priority given to the sequence indicators 204 can be configured by a system administrator, based on the criticality of the data contained in the input message 112, e.g. updates to patient address information versus diagnosis data to be used for scheduling of surgery. The following gives example message types having various degrees of priority.

Demographics

Full demographics data, including patient identifiers, address, phone numbers, next-of-kin, insurance coverage information, and guarantor can be imported from other systems 114, such as clinic practice management systems 114 and hospital information systems 114. This data can be used when populating external systems 118 such as but not limited to clinical data repositories (CDRs), external transcription systems, and lab information systems.

Notes

Documents such as transcribed encounter notes, radiology reports, hospital discharge summaries, and pathology reports can be included in the input messages 112 for eventual association with a patient's medical record. These documents can be exported as messages 116 to information systems such as the CDR.

Observations (e.g. Lab Results)

Laboratory results from a reference laboratory or a hospital's internal laboratory system 114 are imported to the patient's medical record electronically. After the care provider has reviewed and authenticated the lab results, the discrete lab values can be further distributed to the patient's medical record. Further, it is recognized that clinical observations collected during a patient encounter (blood pressure, heart rate) can be sent as message 116 to the system 118 such as a CDR. In addition, laboratory results sent directly from a reference lab system 114 to the interface engine 110 can also be forwarded to the CDR.

Scheduling

External scheduling systems 114 can systematically send appointment-related messages 112 to the interface engine 110 for eventual use in updating healthcare workers' schedules of a scheduler system 118, as well for exam scheduling.

Procedures

Documented services rendered during a patient encounter can be exchanged between the systems 114, 118, such as but not limited to practice management systems, managed care systems, and CDRs.

Allergies

Allergy information documented during an encounter can be exchanged between the systems 114, 118, such as but not limited to clinical data repositories or other in-patient EMR systems.

Example Operation of the Interface Engine 110

Figure 5:
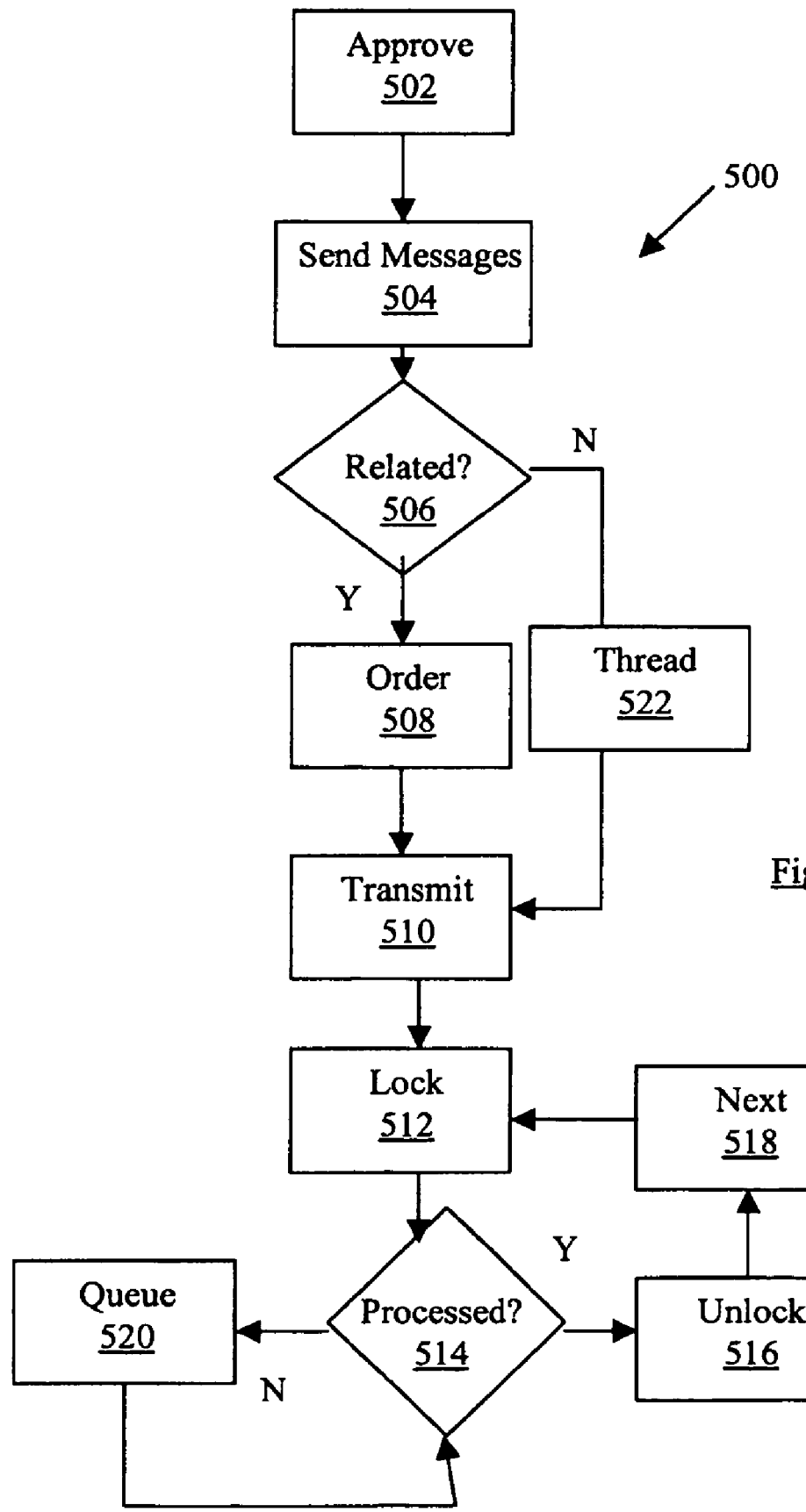
FIG. 5 is an example operation of the interface engine of FIG. 2.

Referring to FIGS. 1, 2 and 5, a message processing scenario 500 provides an example of how out of sequence messaging 112, 116 can cause problems in a health care environment 100. In this scenario, Percipio (e.g. system 118) is integrating with a reporting system 114 called ReportCo via the Interface Engine 110. The ReportCo system 114 is used by radiologists to dictate reports. In the ReportCo system 114, when a radiologist approves a report 502 and marks it final the ReportCo system 114 sends out 504 two HL7 input messages 112 to the interface engine 110 for eventual receipt by the Percipio system 118, in the required indented order of Preliminary Result and then Final Result. The first input message 112 is the Preliminary Result which contains the entire report body. In this case it is an urgent abnormal report. Immediately after the Preliminary Result, the second Final Result input message 112 is sent. This message 112 does not contain any report text rather only marks the report as final.

It should be noted that in a prior art interface system (not shown) that processes messages in parallel without ID Locking, there is potential here that the Final Result message could be processed before the Preliminary Result. In this case a blank report would be created in the Percipio system, marked as final. The Preliminary Result message would then fail because we already have a final status. This is undesirable as now Percipio is not aware of the abnormal report, even worse, the provided report is blank.

Referring again to FIGS. 1, 2 and 5, contrary to prior art systems, the sequencer module 132 of the interface engine 110 notes the indent order of first the Preliminary Result and then second the Final Result to be received and processed by the target system 118, Percipio. The sequencer module 132 identifies 506 the Preliminary Result and Final Result input messages 112 as related through their similar unique ID 202 (e.g. patient MRN) and further determines 508 the correct indent order though the sequence indicators 204. The sequencer module 132 then coordinates 510 transmission to the Percipio system 118 of the Preliminary Result output message 116 through the transmitter 122, and then locks/inhibits 512 further output message 116 transmission for the Final Result output message 116 (also bearing the same patient MRN)—as well as any other related output messages 116 deemed to have a later indent order of the related message group 206. Once the sequencer module 132 determines 514 that the Preliminary Result output message 116 has been adequately processed, the sequencer module 132 unlocks 516 the patient MRN and provides 518 the transmitter 122 the next output message 116 for transmission to the target Percipio system 118 and the locking procedure as described above is repeated. Otherwise, if the registry 131 is still locked for the respective ID 202 then the sequencer module 132 retains 520 the next output message 116 (e.g. the Final Result) in the output queue 130 (i.e. does not transfer the next output message 116 between threads 200 of the stages 140, as described above) and periodically checks or is informed at step 514 clearance of the registry 131. It is recognized that during the above coordination related output message 116 transmission, the sequencer module 132 also coordinates the sending of unrelated output messages 116 (identified via dissimilar unique IDs 202) through parallel threads 200 in the stages 140 at step 522.

Accordingly, the interface engine 110 uses ID 202 locking so that the two result output messages 116 would be identified as related messages because the patient MRNs match. Therefore the Preliminary Result would be processed before the Final Result. Meanwhile, output messages 116 for other patients can be processed in parallel through the respective stages 140 of the output queue 130.

Further Example of Interface Engine 110 Operation

With reference to FIGS. 4 and FIGS. 7a through 7m, with each step of the message 116 processing represented by a corresponding FIG. 7a through 7m. Accordingly, the threading procedure performed by the interface engine 110 is shown, on a step by step basis, e.g. the processing order for messages LISA1, LISA2, BOB1, BOB2, BOB3, CAT, JOHN, and PAT. In each step the output messages 116 are listed in the expected filing sequence within each stage 140 of the output queue 130. The top of each list is the first message 116 to exit the output queue 130, and the bottom of each list is the last message to exit the output queue 130. The identifier [n] denotes output messages 116 that are for the same person where n is order that the corresponding input message 112 was received, i.e. the sequence indicator 204. This received or otherwise predefined input message 112 sequence, as represented by the identifier [n] must be preserved by the interface engine 110, as this is the indent order expected or otherwise intended for receipt by the target system 118.

In FIGS. 7a through 7m, the Lock column identifies the moment when the sequencer module 132 detects a lock in the output queue 130. This column will show the message's 116 predecessor who must exit the next stage 140 of the output queue 130 before the message 116 in question can proceed.

Figure 7C:
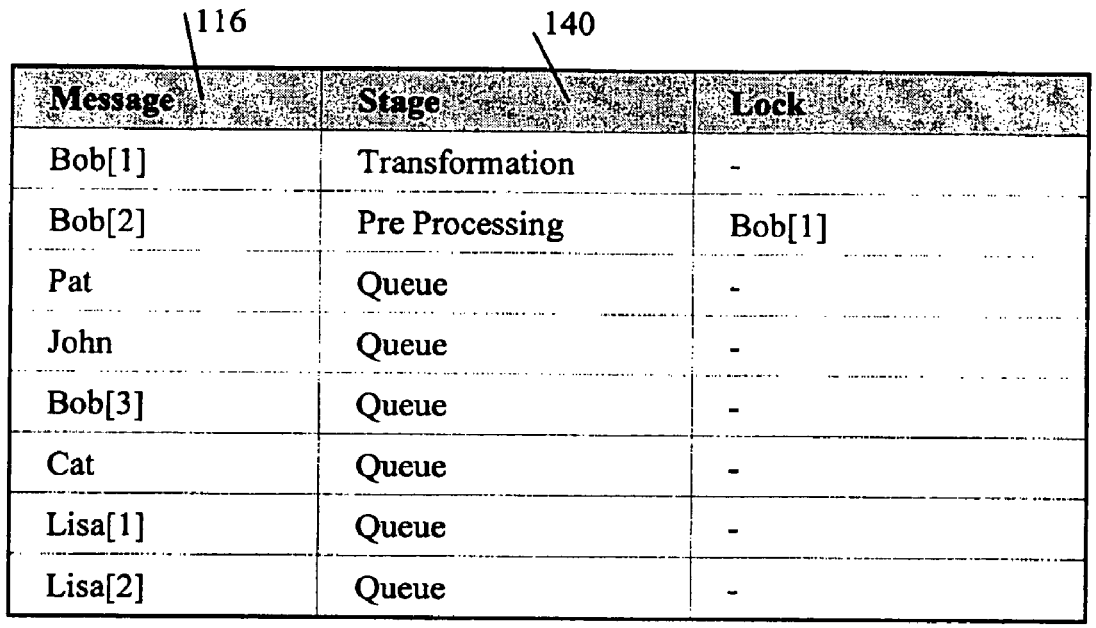

Referring to FIG. 7a, the messages 116 are received by the interface engine 110 and queued in sequence shown. Referring to FIG. 7b, the first message (BOB1) is read from the Queue stage and enter the output queue 130 at the stage 144. Referring to FIG. 7c, the first message (BOB1) moves on to the transformation stage 146 with a lock on the transformation stage 146 against BOB2, while the second related message BOB2 enters the stage 144 (i.e. the thread 200 vacancy at the stage 144 is filled by the message BOB2 due to passing, with unlocking, of message BOB1 from stage 144). It is recognized that the interface engine 110 has recognized the indent order of the BOBn messages as first BOB1, second BOB2, and last BOB3. Similar indent order logic is used for messages LISA1 and LISA2.

Figure 7D:
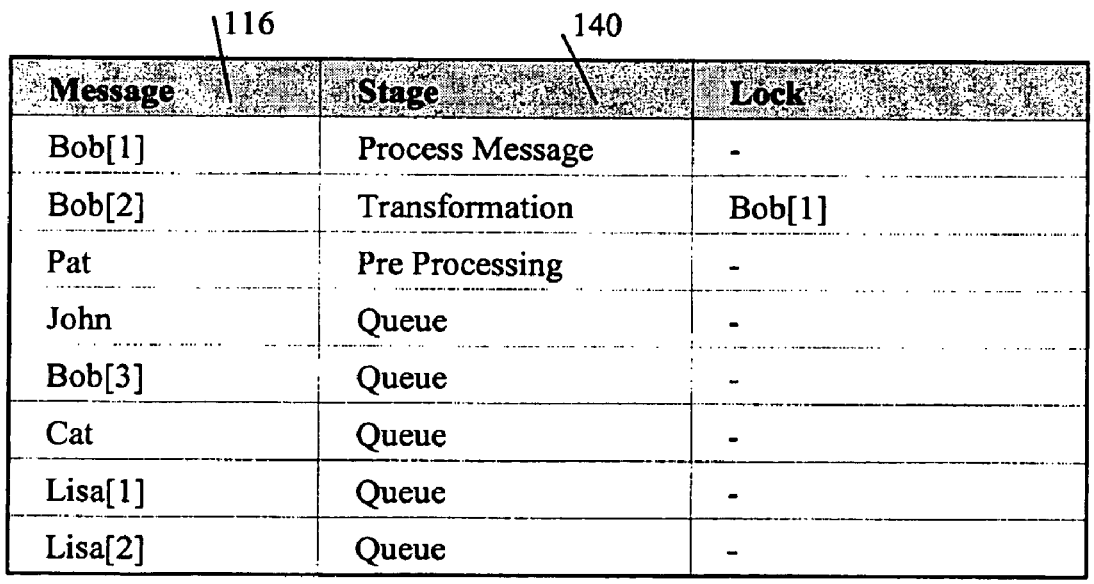
Figure 7E:
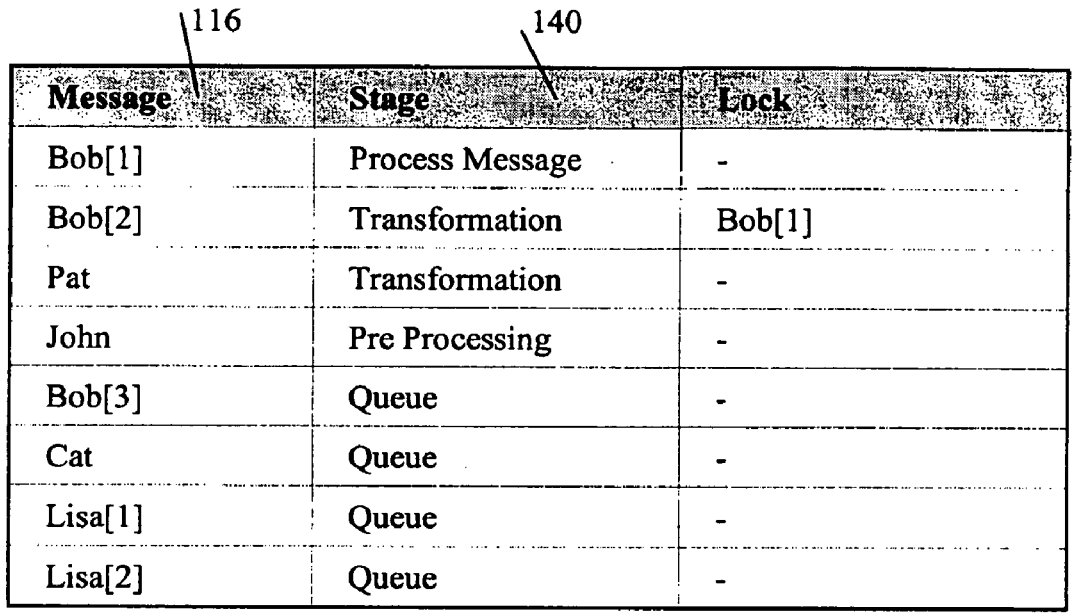
Figure 7F:
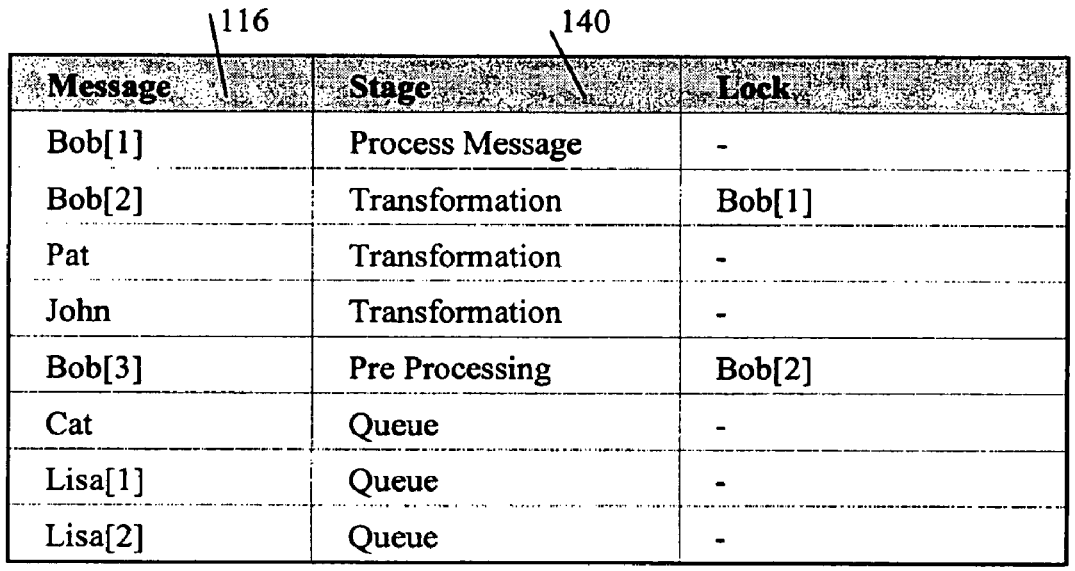
Figure 7G:
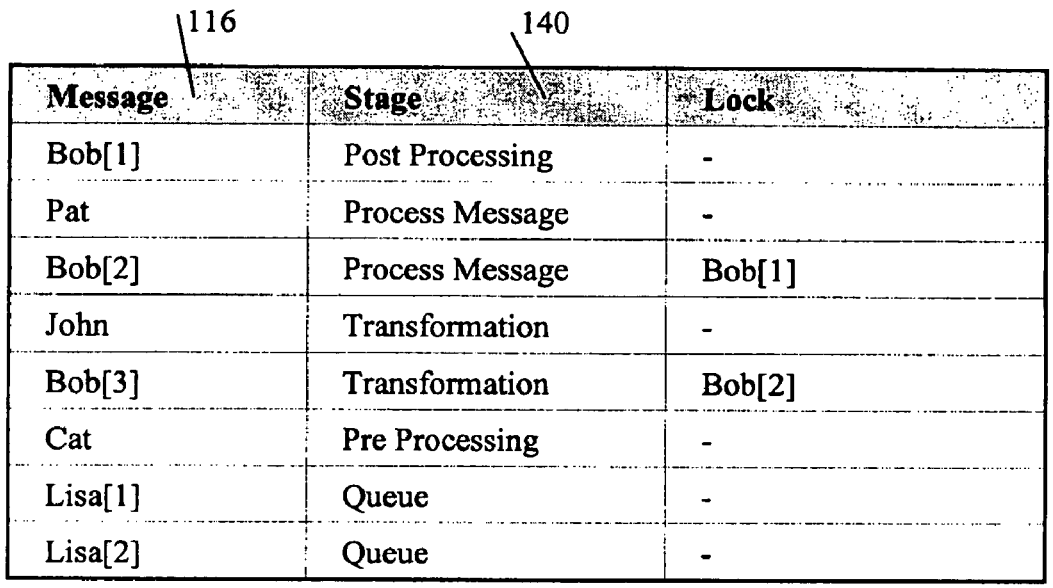

Referring to FIG. 7d, message BOB1 enters the stage 148 with a corresponding lock against message BOB2, while message BOB2 enters the stage 146 and message PAT enters the stage 144. Referring to FIG. 7e, message BOB1 maintains its lock on the stage 148 against message BOB2, message BOB2 is held up at the stage 146 due to the respective lock at the stage 148 by message BOB1, message PAT stays at the stage 146, and message JOHN enters the stage 144. Referring to FIG. 7f, message BOB1 still remains with lock on the stage 148 against message BOB2, messages BOB2 and PAT remain at stage 146 and JOHN enters stage 146, and message BOB3 enters stage 144 while having a lock against message BOB3 at stage 146 by message BOB2. Referring to FIG. 7g, message BOB1 passes to the stage 150 with a corresponding lock on the stage 150 against message BOB2, message PAT and BOB2 move on to the stage 148 with message BOB2 obtaining a corresponding lock on the stage 148 against message BOB3, message JOHN remains at the stage 146, message BOB3 moves on to stage 146, and message CAT moves into stage 144.

Figure 7H:
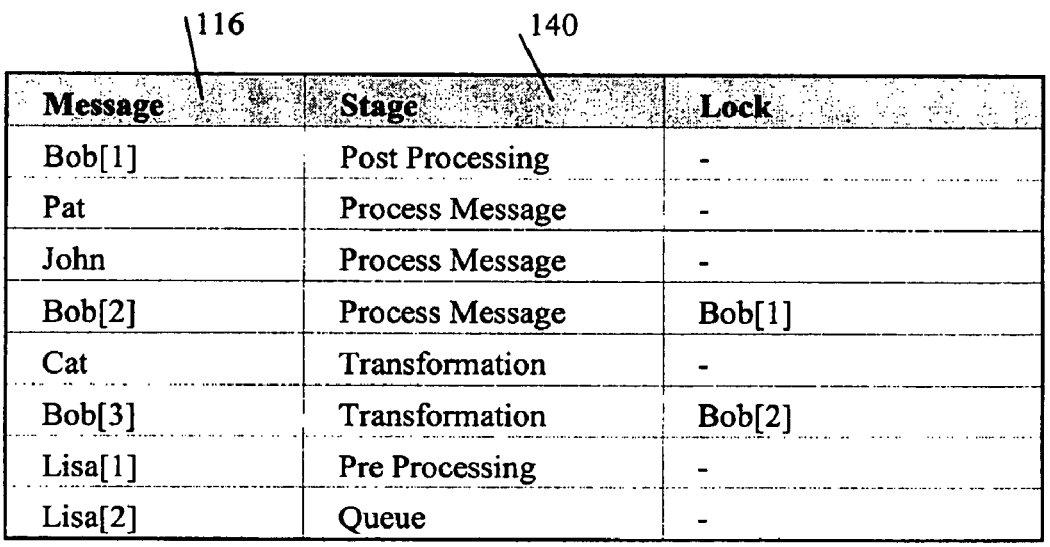
Figure 7I:
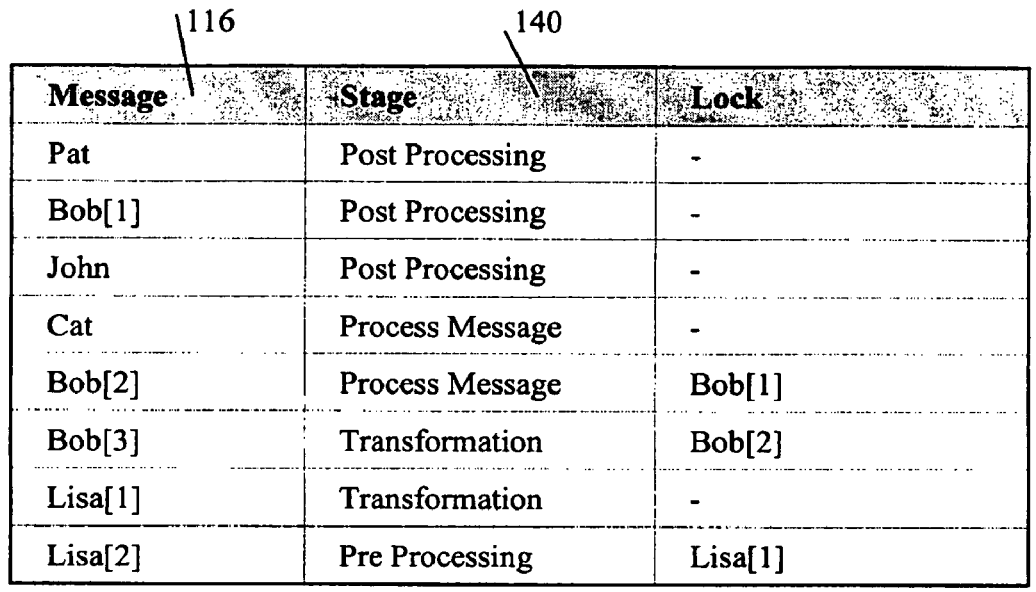
Figure 7J:
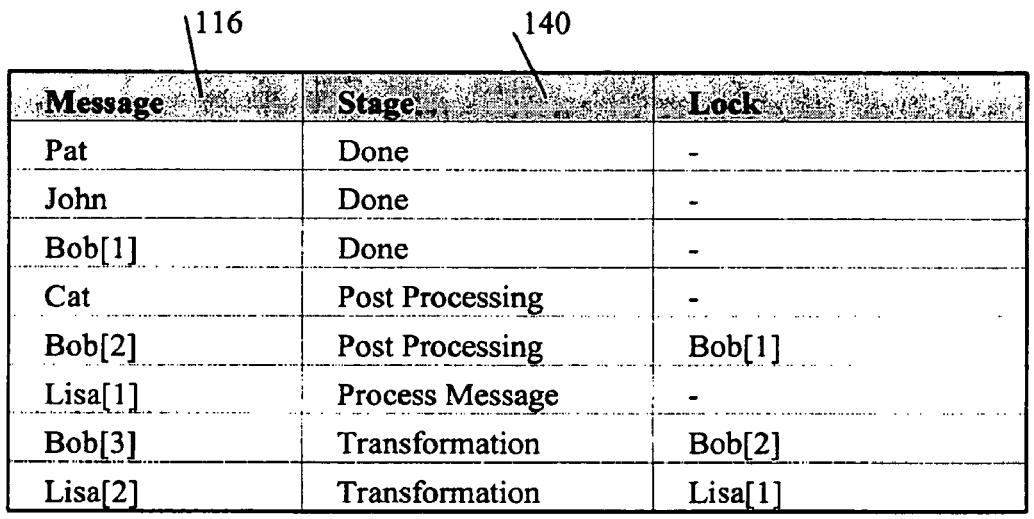

Referring to FIG. 7h, message BOB1 remains at stage 150 with the lock against message BOB2, messages PAT JOHN and BOB2 remain at stage 148 with message BOB2 maintaining a lock on stage 148 against message BOB3, message CAT enters stage 146 with message BOB3 staying at stage 146 due to occupancy of stage 148 by message BOB2, and message LISA1 enters stage 144. Referring to FIG. 7i, message BOB1 remains at stage 150 thereby locking message BOB2 from stage 150, messages PAT and JOHN move to stage 150, message CAT moves to stage 148, message BOB2 remains at stage 148 due to the block of message BOB1 at stage 150, similarly message BOB3 remains at stage 146 due to block of stage 148 due to message BOB2, message LISA1 moves to stage 146 with corresponding lock against message LISA2 on stage 146, and message LISA2 moves to stage 144. Referring to FIG. 7j, messages PAT JOHN and BOB1 are finished processing, message BOB2 is now free to move to stage 150 seeing the lock of BOB1 has been removed, message CAT moves to stage 150, message LISA1 moves to stage 148 and releases the lock against message LISA2 for stage 146, message BOB3 remains in stage 146 since the lock by message BOB2 of stage 148 has not yet been accomplished, and message LISA2 moves to stage 146.

Figure 7K:
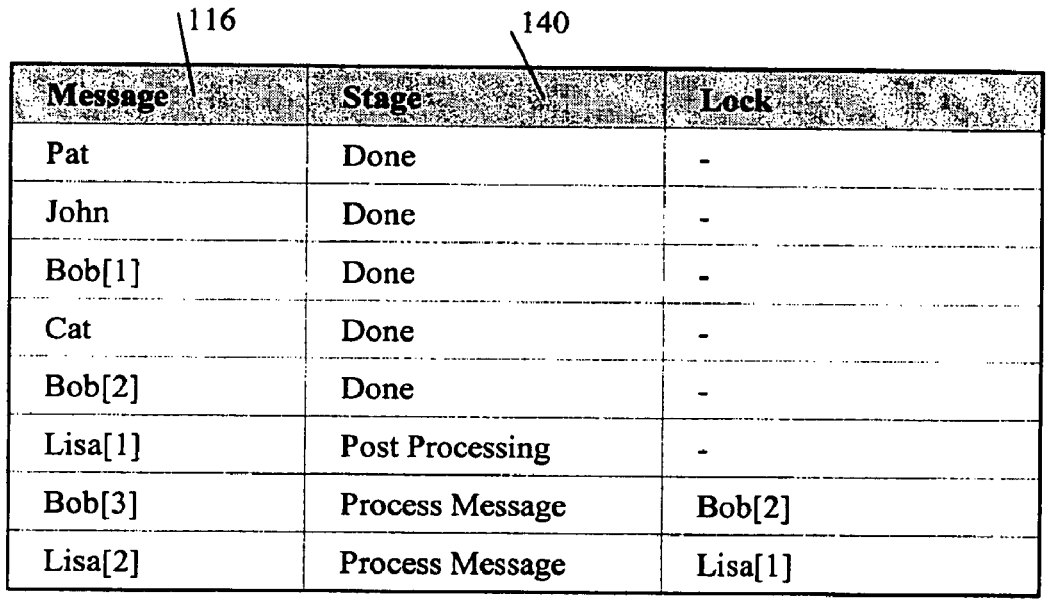
Figure 7L:
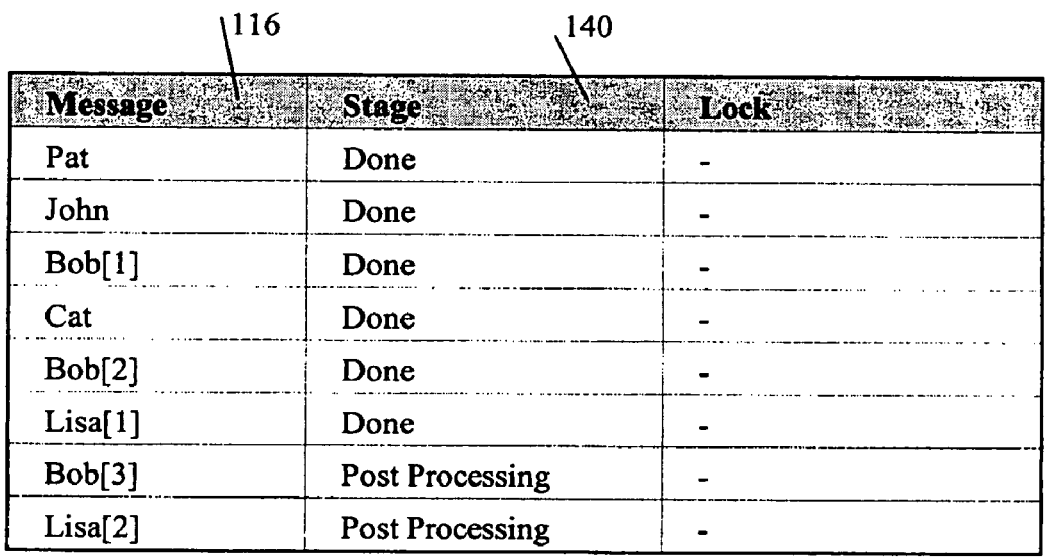
Figure 7M:
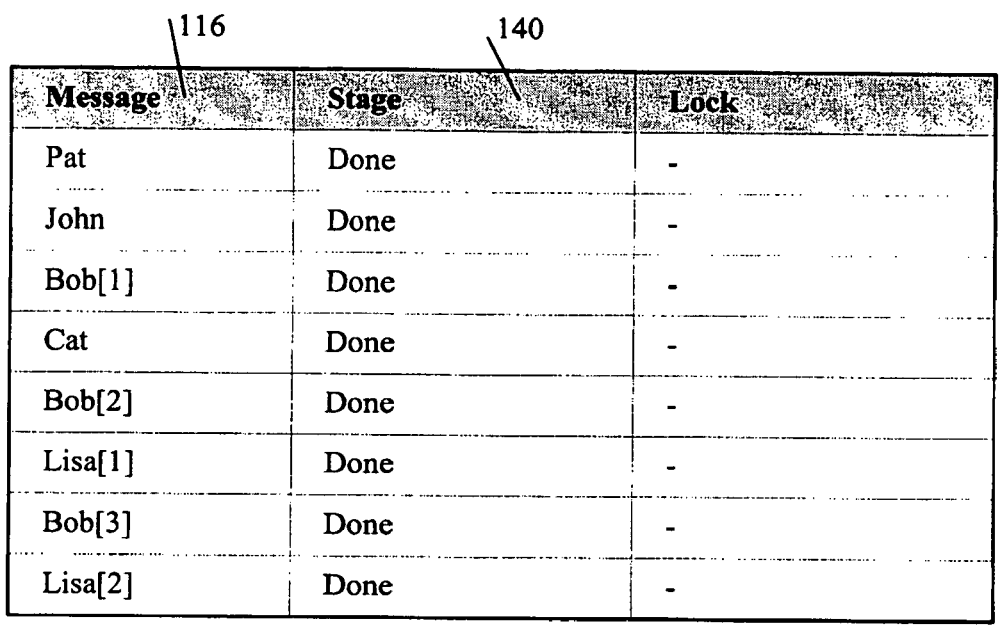

Referring to FIG. 7k, messages CAT and BOB2 are completed and the lock of stage 148 against message BOB3 is removed, message LISA1 moves on to stage 150 and releases the lock of stage 148 against message LISA2, message BOB3 moves on to available state 148, and message LISA2 moves on to available state 148. Referring to FIG. 7l, message LISA1 is completed and the lock of stage 150 against message LISA2 is removed, the lock against message BOB3 from stage 150 is removed and message BOB3 moves to stage 150, and the lock against message LISA2 from stage 150 is removed and message LISA2 moves to stage 150. Referring to FIG. 7m, all messages are now completed and the message queue 130 is empty awaiting further input messages 112 to be received by the interface engine 110. It is recognized that typically the output message queue 130 would almost always contain output messages 116 due to a constant throughput of messages 112, 116 between the systems 114, 118.

Further, it is noted that in the above described interface scenario of FIGS. 7a through 7m, a stream of the input messages 112 were received in the following order; Bob[1], Bob[2], Pat, John, Bob[3], Cat, Lisa[1], and Lisa[2]. At the end of the scenario the stream of messages were actually processed in the following order; Pat, John, Bob[1], Cat, Bob[2], Lisa[1], Bob[3], and Lisa[2]. Accordingly, it is noted that messages for Bob would have slowed down the entire queue 130 unless the unrelated messages were processed in parallel threads 200, while maintaining the indent order of the related BOB messages.

Figure 8:
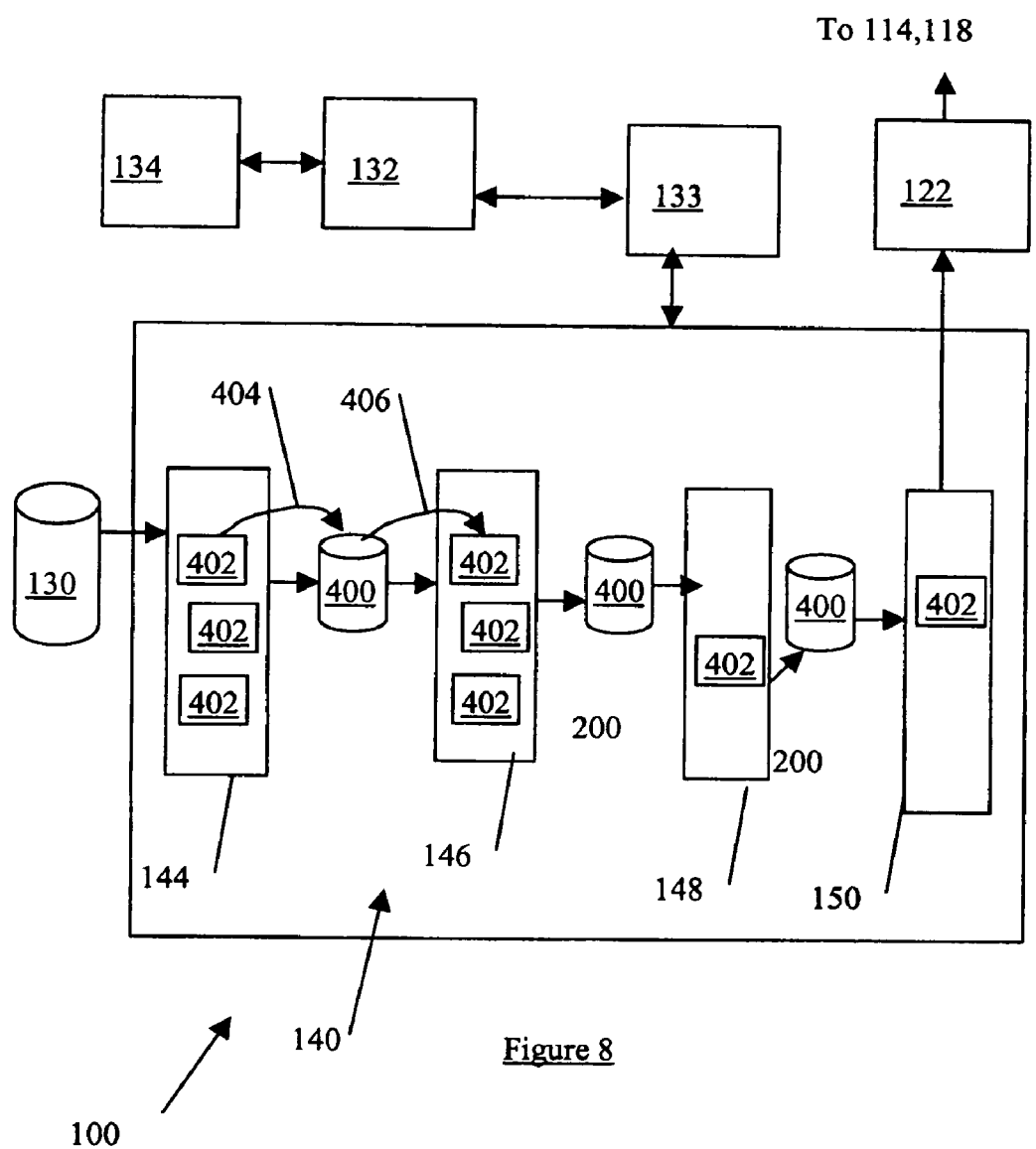
FIG. 8 is an alternative embodiment of FIG. 4.

Referring to FIG. 8, an alternative embodiment of the system 100 is shown. The respective stages 140 of input queue 130, pre-processing 144, transformation 146, process message 148, and post processing 150 can be coupled by storage mediums 400, such as but not limited to FIAO storage devices. The storage mediums 400 are used as memory buffers between processes 402 in each of the stages 140. Accordingly, the execution streams 200 (see FIG. 4) are represented by a plurality of the individual processes 402 in conjunction with the storage mediums 400 between the individual processes 402. For example, process 402 of stage 144 finishes processing the message 116 and then stores 404 the result in storage medium 400. Once one of the processes 402 of stage 146 becomes available (as described above with respect to the example threads 200 of FIGS. 4 and 7a-m), the queue manager 133 in conjunction with the sequencer module 132 coordinates removal 406 of the message 116 from the storage medium 400 for passing to the available process 402 of the next stage 146. It is recognized that in processing of the messages 116 in the output message queue 130, some of the stages 140 can be skipped during message processing (e.g. no transformation required so the transformation stage 146 would be skipped).

It will be evident to those skilled in the art that the interface engine 110 and its corresponding components 102 can take many forms, and that such forms are within the scope of the invention as claimed. In view of the above, the spirit and scope of the appended claims should not be limited to the examples or the description of the preferred versions contained herein.

I claim:

1. A system for coordinating concurrent processing of a plurality of messages communicated over a network between a source system and a target system, the plurality of messages configured for including a pair of related messages having a common first unique message identifier and at least one unrelated message having a second unique message identifier different from the first unique identifier, the system comprising:
at least one computer processor;
an input queue coupled to the at least one computer processor for storing the plurality of messages when received;
an output message queue for storing the plurality of messages during message processing, the output message queue coupled to the at least one computer processor including a plurality of execution streams for facilitating concurrent processing of the at least one unrelated message with at least one of the pair of related messages;
a sequencer module executable by the at least one computer processor for determining by using the first and second unique identifiers which of the plurality of messages are the pair of related messages and which of the plurality of messages are the at least one unrelated message, the sequencer module further configured for identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages, such that the first message having a higher priority sequence indicator than the sequence indicator of the second message; and
a registry coupled to the sequencer module and configured for storing a pending message status indicator for the first message in the output message queue;
wherein the sequencer module inhibits the progression of processing through the output message queue for the second message until the pending message status for the first message is removed from the registry while facilitating concurrent processing of the at least one unrelated message through the output message queue.

2. The system of claim 1 further comprising a plurality of stages included in the output message queue, each of the stages for providing at least one step in the processing of the plurality of messages though the output message queue.

3. The system of claim 2, wherein at least two of the plurality of stages each includes at least two concurrent execution streams of the plurality of execution streams.

4. The system of claim 3, wherein the execution streams of the plurality of execution streams are each represented as a thread of execution.

5. The system of claim 3, wherein the execution streams of the plurality of the execution streams are each represented as a plurality of individual processes running in parallel, each of the processes for providing message processing suitable for the stage associated with the individual process.

6. The system of claim 5 further comprising at least one storage located between two adjacent ones of the plurality of stages, the storage for storing the at least one unrelated message and at least one of the related messages.

7. The system of claim 6, wherein the storage is a first-in-any-out memory device.

8. The system of claim 3 further comprising a queue manager coupled to the sequencer module for facilitating passing of the plurality of messages between the plurality of stages according to available ones of the execution streams as determined by the sequencer module based on the pending message status indicator.

9. The system of claim 2, wherein the plurality of stages is selected from the group comprising: a queue stage in which the plurality of messages are stored once received; a pre-processing stage where the plurality of messages are parsed into a basic structure and qualified; a transformation stage where the plurality of messages are transformed according to user defined mappings and internal transformations; a process message stage where the plurality of messages are processed for network routing considerations and slated or transmission to the target system; and a post processing stage where the plurality of messages are transferred from a received status to an error for processed status.

10. The system of claim 2 further comprising the sequencer module configured for using concurrently a plurality of the pending message status indicators associated with the first and second messages in at least two of the plurality of stages.

11. A method for coordinating concurrent processing of a plurality of messages communicated over a network between a source system and a target system, the plurality of messages configured for including a pair of related messages having a common first unique message identifier and at least one unrelated message having a second unique message identifier different from the first unique identifier, the method comprising the steps of:
receiving the plurality of messages; identifying which of the plurality of messages are the pair of related messages and which of the plurality of messages are the at least one unrelated message using the first and second unique identifiers;
identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages, such that the first message having a higher priority sequence indicator than the sequence indicator of the second message;
monitoring the processing of the pair of related messages and the at least one unrelated message in an output message queue by inhibiting processing of the second message until a pending message status indicator for the first message is cleared while facilitating concurrent processing of the at least one unrelated message though the output message queue, the pending message status indicator for indicating that the first message is resident in the message output queue, the output message queue including a plurality of execution streams for facilitating concurrent processing of the at least one unrelated message with at least one of the pair of related messages when resident in the output message queue.

12. The method of claim 11 further comprising the step of processing the plurality of messages in the output message queue using a plurality of stages, such that each of the stages provides at least one step in the processing of the plurality of messages though the output message queue.

13. The method of claim 12, wherein at least two of the plurality of stages each includes at least two concurrent execution streams of the plurality of execution streams.

14. The method of claim 13, wherein the execution streams of the plurality of execution streams are each represented as a thread of execution.

15. The method of claim 13, wherein the execution streams of the plurality of the execution streams are each represented as a plurality of individual processes running in parallel, each of the processes for providing message processing suitable for the stage associated with the individual process.

16. The method of claim 15 further comprising the step of storing the at least one unrelated message and at least one of the related messages in a storage located between two adjacent ones of the plurality of stages.

17. The method of claim 16, wherein the storage is a first-in-any-out memory device.

18. The method of claim 13 further comprising the step of passing of the plurality of messages between the plurality of stages according to available ones of the execution streams as determined by the sequencer module based on the pending message status indicator.

19. The method of claim 12, wherein the plurality of stages is selected from the group comprising: a queue stage in which the plurality of messages are stored once received; a pre-processing stage where the plurality of messages are parsed into a basic structure and qualified; a transformation stage where the plurality of messages are transformed according to user defined mappings and internal transformations; a process message stage where the plurality of messages are processed for network routing considerations and slated for transmission to the target system; and a post processing stage where the plurality of messages are transferred from a received status to an error or processed status.

20. The method of claim 12 further comprising the step of using concurrently a plurality of the pending message status indicators associated with the first and second messages in at least two of the plurality of stages.

21. A computer program product having instructions stored on a non-transitory storage and configured for execution by a computer processor to coordinate concurrent processing of a plurality of messages communicated over a network between a source system and a target system, the plurality of messages configured for including a pair of related messages having a common first unique message identifier and at least one unrelated message having a second unique message identifier different from the first unique identifier, the instruction executable by a computer processor, the instructions comprising:
storing of the plurality of messages in an input queue when received;
storing of the plurality of messages in an output message queue during message processing, the output message queue for providing a plurality of execution streams for facilitating concurrent processing of the at least one unrelated message with at least one of the pair of related messages;
determining using the first and second unique identifiers which of the plurality of messages are the pair of related messages and which of the plurality of messages are the at least one unrelated message;
identifying a sequence order for the pair of related messages according to a respective sequence indicator associated with each of the related messages, the sequence indicators configured for use in assigning a first position in the sequence order for a first message of the pair of related messages and for use in assigning a second position in the sequence order for a second message of the pair of related messages, such that the first message having a higher priority sequence indicator than the sequence indicator of the second message; and
storing a pending message status indicator in a registry for the first message, when the first message is in an output message queue;
wherein the progression of processing through the output message queue is inhibited for the second message until the pending message status for the first message is removed from the registry while facilitating concurrent processing of the at least one unrelated message though the output message queue.

* * * * *